United States Patent
Kennedy et al.

(10) Patent No.: US 10,829,911 B2
(45) Date of Patent: Nov. 10, 2020

(54) VISUAL ASSISTANCE AND CONTROL SYSTEM FOR A WORK MACHINE

(71) Applicant: Deere & Company, Moline, IL (US)

(72) Inventors: Thomas L. Kennedy, Dubuque, IA (US); David J. Myers, Asbury, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 16/122,121

(22) Filed: Sep. 5, 2018

(65) Prior Publication Data

US 2020/0071912 A1    Mar. 5, 2020

(51) Int. Cl.
| | |
|---|---|
| *G06K 9/00* | (2006.01) |
| *E02F 9/26* | (2006.01) |
| *G06T 19/00* | (2011.01) |
| *G02B 27/01* | (2006.01) |

(52) U.S. Cl.
CPC .......... *E02F 9/264* (2013.01); *G02B 27/0101* (2013.01); *G06K 9/00671* (2013.01); *G06T 19/006* (2013.01)

(58) Field of Classification Search
USPC .......................................................... 701/50
See application file for complete search history.

(56) References Cited

U.S. PATENT DOCUMENTS

| | | | |
|---|---|---|---|
| 6,735,888 B2 | 5/2004 | Green et al. | |
| 7,516,563 B2 | 4/2009 | Koch | |
| 9,598,036 B2* | 3/2017 | Lim | B66C 15/06 |
| 2004/0140923 A1* | 7/2004 | Tucker | G01V 15/00 |
| | | | 342/22 |
| 2004/0210370 A1* | 10/2004 | Gudat | E02F 3/435 |
| | | | 701/50 |

(Continued)

FOREIGN PATENT DOCUMENTS

| | | |
|---|---|---|
| JP | 2008101416 A | 5/2008 |
| JP | 2016195457 | 3/2018 |

OTHER PUBLICATIONS

German Search Report issued in counterpart application No. 102019210970.5 dated Apr. 21, 2020 (06 pages).

(Continued)

*Primary Examiner* — James M McPherson
(74) *Attorney, Agent, or Firm* — Joseph R. Kelly; Kelly, Holt & Christenson, PLLC

(57) ABSTRACT

A work machine includes a frame and a set of ground engaging elements movably supported by the frame and driven by an engine to drive movement of the machine in a worksite. The machine includes a location sensor configured to generate a machine location sensor signal indicative of a location of the machine. The machine includes a communication component that communicates with a worksite server and retrieves object location data. The machine also includes virtual model generator logic that determines the object is within a field of view of an operator of the machine, based on the machine location sensor signal and object location data, and generates an augmentation indication indicative of the determination. The machine includes augmentation logic that generates and displays an augmented reality overlay, based on the augmentation indication, and displays an indication of the object proximate the object within the field of view of the operator.

13 Claims, 13 Drawing Sheets

(56) References Cited

U.S. PATENT DOCUMENTS

| | | |
|---|---|---|
| 2004/2103070 | 10/2004 | Gudat et al. |
| 2012/0237083 A1* | 9/2012 | Lange .................... G06F 16/29 |
| | | 382/103 |
| 2013/0054097 A1 | 2/2013 | Montgomery |
| 2013/0103271 A1* | 4/2013 | Best ....................... G01S 19/14 |
| | | 701/50 |
| 2014/0188333 A1 | 7/2014 | Friend |
| 2014/0354813 A1* | 12/2014 | Ishimoto ................. B60R 1/00 |
| | | 348/148 |
| 2015/0249821 A1* | 9/2015 | Tanizumi ............... B66C 13/00 |
| | | 348/46 |
| 2017/0220044 A1* | 8/2017 | Sakai ................... G05D 1/0219 |
| 2018/0137446 A1 | 5/2018 | Shike et al. |
| 2018/0277067 A1* | 9/2018 | Tentinger ............. A01B 69/001 |
| 2019/0194913 A1* | 6/2019 | Petrany .................. E02F 9/265 |
| 2020/0071912 A1 | 3/2020 | Kennedy et al. |

OTHER PUBLICATIONS

Application and Drawings for U.S. Appl. No. 16/830,730, filed Mar. 26, 2020, 37 pages.
Application and Drawings for U.S. Appl. No. 16/661,556, filed Sep. 5, 2019, 25 pages.
Application and Drawings for U.S. Appl. No. 16/803,603, filed Feb. 27, 2020, 34 pages.

\* cited by examiner

VISUAL ASSISTANCE AND CONTROL SYSTEM FOR A WORK MACHINE

FIELD OF THE DESCRIPTION

The present disclosure relates generally to devices for use in earth-moving operations. More specifically, but not by way of limitation, this disclosure relates to a visual assistance and control system for an earth grading operation.

BACKGROUND

There are many different types of work machines. Some such work machines include agricultural machines, construction machines, forestry machines, turf management machines, among others. Many of these pieces of mobile equipment have mechanisms that are controlled by the operator in performing operations. For instance, a construction machine can have multiple different mechanical, electrical, hydraulic, pneumatic and electro-mechanical subsystems, among others, all of which can be operated by the operator to grade a worksite. Achieving a proper grade in a worksite operation is often a first step of the entire operation.

The discussion above is merely provided for general background information and is not intended to be used as an aid in determining the scope of the claimed subject matter.

SUMMARY

A work machine includes a frame and a set of ground engaging elements movably supported by the frame and driven by a power source (e.g., an engine) to drive movement of the machine in a worksite. The machine includes a location sensor configured to generate a machine location sensor signal indicative of a location of the mobile work machine. The machine includes a communication component that communicates with a worksite server and retrieves object location data. The machine also includes virtual model generator logic that determines the object is within a field of view of an operator of the machine, based on the machine location sensor signal and object location data, and generates an augmentation indication indicative of the determination. The machine includes augmentation logic that generates and displays an augmented reality overlay, based on the augmentation indication, and displays an indication of the object, proximate the object within the field of view of the operator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
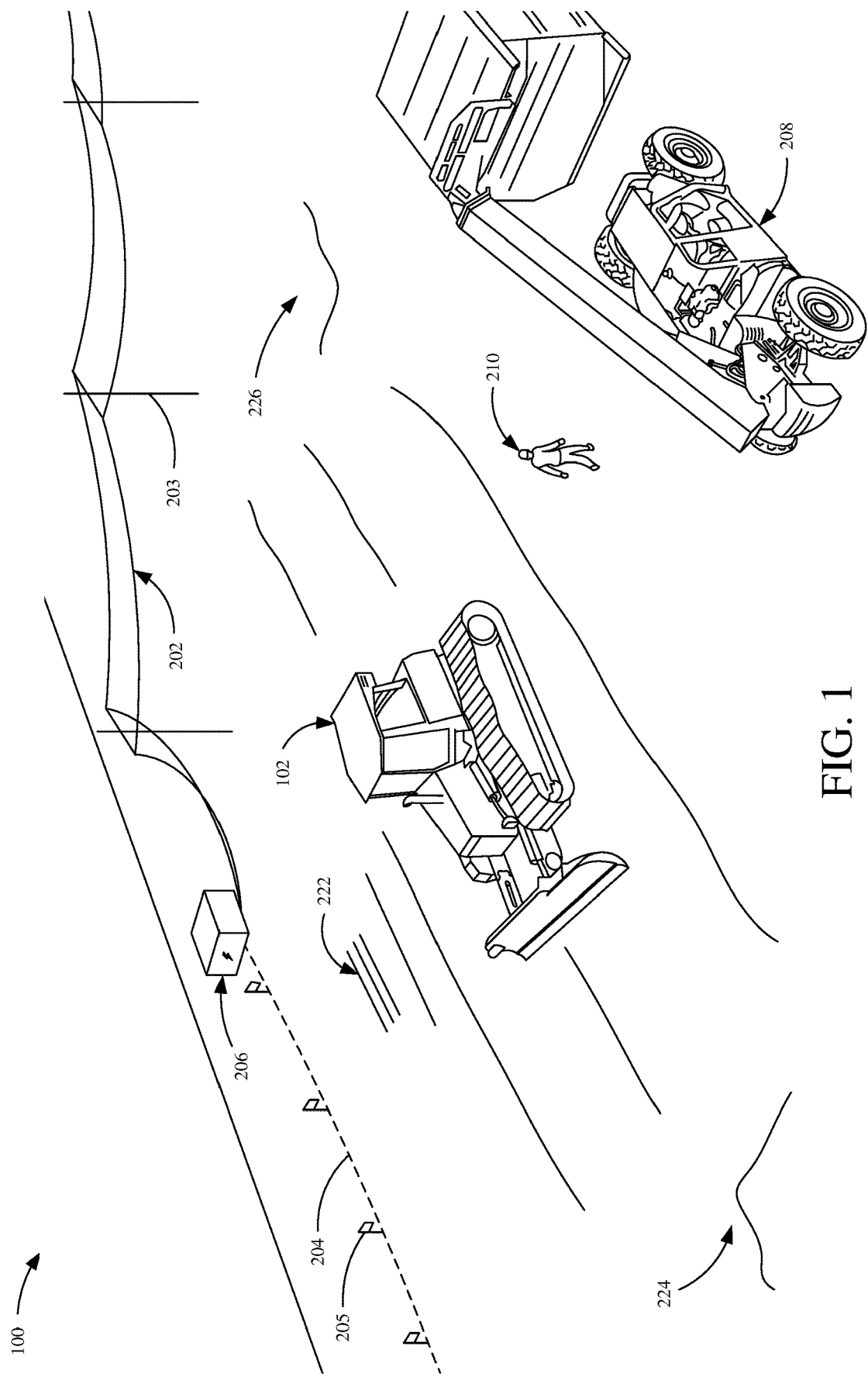
FIG. 1 is a perspective view showing one example of a work site.

Worksites are often complicated, with many different work machines and workers performing many different operations at any given time. The more complicated a worksite gets, the more difficult it can be for an operator of a work machine to complete their task while avoiding collisions with hazards, such as another work machine, an above or below ground hazard, a person at the worksite or any other object. Accordingly, it would be beneficial for an operator of a work machine to have a visual assistance system and/or an avoidance control system.

One example of a visual assistance system includes a head up display or augmented reality display. Various objects, on this display, can be emphasized to the machine operator so the operator is better aware of the object and can avoid a collision. An augmented display can allow the operator to simultaneously view the emphasized object and the area they are working in. For instance, the head up display or augmented reality display may be on a head-mounted device, window of cab of the work machine, that super imposes or overlays emphasis on the operator's natural field of view.

The visual assistance system can include a worksite server that has a live database of the positions of objects in the worksite. The mobile machine can send information indicative of a current location of the machine, and, in return, the visual assistance system provides data indicative of objects proximate the mobile machine. Using this data, the visual assistance system can visually emphasize the various objects to the operator of a work machine. In addition to emphasizing objects to be avoided, objects or terrain can be emphasized to the operator to help complete their given task.

As an example, an operator that is grading a worksite with a crawler dozer may be displayed an augmented reality where terrain that is above the final finish grade is in a specific color (e.g., red), terrain that is below final finish grade is in another color (e.g., blue), and terrain that is at finish grade is in another color (e.g., green). This way the operator can more clearly see what areas need to be further graded and what areas are complete. At the same time, or in the alternative, the operator may be displayed an augmented reality where people, belowground hazards (e.g., drain tile or underground electrical), aboveground hazards (e.g., overhead utility lines or electrical extension cords) are emphasized. This way, the operator can more clearly see these objects and can avoid them while performing the grading operation. Additionally, an indication of the distance to an object can be displayed in association with that object on the augmented display.

An avoidance control system can similarly be tied into a worksite server that has a live database of the positions of objects in a worksite and/or terrain worksite. The avoidance control system can receive a mobile machine position and using this and other data, the avoidance control system can prevent collisions between the work machine and other objects on the worksite.

A majority of the following description refers to a work machine as being a crawler dozer, however, it is explicitly contemplated that the systems and methods described below may be implemented on other types of work machines as well, for example, but not limited to excavators, loaders, trucks, tractors, other crawlers, etc.

FIG. 1 is a perspective view showing one example of a worksite 100. A typical worksite comprises a variety of different hazards, work machines, workers, generally referred to hereinafter as objects. Worksite 100 includes work machines 102 and 208, overhead hazard 202, underground hazard 204, on-ground hazard 206, people 210, finished-grade surface 222, above-grade surface 224 and below-grade surface 226.

Work machine 102 operates to grade the terrain of worksite 100 to a finished grade. As shown, some portions of worksite 100 are finished-grade surfaces 222 while other surfaces may be above-grade surfaces 224 or below-grade surfaces 226. Work machine 102 can operate to lower any above-grade surfaces 224 and raise or fill any below-grade surfaces 226.

The surface of worksite 100 may be comprised of a single material, (e.g., sand, gravel, etc.) or, are otherwise visually similar. Because of this, it may be difficult for an operator to see which portions of the worksite surface are at finish grade (e.g., finished-grade surfaces 222), above grade (e.g., above-grade surface 224) or below grade (e.g., below-grade surfaces 226). To assist an operator in identifying which surfaces of the worksite 100 need further work, a visual assistance system can be utilized to emphasize certain surfaces of worksite 100. For example, finished-grade surfaces 222 can be visually emphasized to the operator (e.g., superimposing a green color over the area) so that the operator is aware that these surfaces do not need further grading. Above-grade surfaces 224 can be visually emphasized to the operator in a different way than finished-grade surfaces 222 (e.g., superimposing a red color over the area) so that the operator is aware that these surfaces need material removed from them to be at a finished grade. Below-grade surfaces 226 can further be visually emphasized to the operator in a different way than either finished-grade surfaces 222 or above-grade surfaces 224 (e.g., superimposing a blue color over the area) so that the operator is aware that these surfaces need material added to them to be at a finished grade. When an area has been graded from either an above or below grade state to a finished grade, the visual emphasis may change, so that the operator is aware which areas have been graded to a finished grade.

While work machine 102 is completing a grading operation, work machine 102 should avoid colliding with other objects in worksite 100. Some examples of other objects in worksite 100 include overhead hazard 202, underground hazard 204, on-ground hazard 206, work machines 208 and people 210. In order to avoid collisions with other objects in worksite 100, a visual assistance system can be provided to the operator of work machine 102 to more clearly emphasize these objects and/or provide alerts when work machine 102 is within a threshold distance of a given object. A visual assistance system can especially be useful in a low contrast or visually impaired environment where objects are less visible due to aerial obscurants (e.g., dust, fog) or covered in a layer of surface obscurant (e.g., dust, dirt).

As shown, overhead hazard 202 is an overhead utility, however worksite 100 may include other types of overhead hazards 202 as well such as but not limited to aerial vehicles, drones, building overhangs, etc. In some instances, overhead hazards 202 are identifiable by overhead indicators 203. For instance, in worksite 100 overhead indicators 203 are utility poles, in other examples, overhead indicators 203 may include signs indicating overhead danger or utility line marking devices (such as a ball or other object coupled to the line for visibility). In other instances, overhead hazards 202 are not easily identifiable and, as such, overhead hazards 202 can be emphasized in the field of view of operator 350. For example, this can be done by superimposing a graphic over their field of view at the hazard's position. For instance, in a case where the overhead hazard 202 is an overhead power line, the line may be illuminated, colored, or otherwise emphasized, in the operator's field of view to stand out from its surroundings.

As shown, underground hazard 204 is an underground natural gas line, however worksite 100 may include other types of underground hazards 204 as well, such as but not limited to drain tile, electrical/optic cables, water lines, other utilities, etc. In some occasions, underground hazards 204 are identifiable by underground indicators 205. For instance, in worksite 100 underground indicators 205 are marking flags. In other examples, underground indicators may include painted lines or contain electrical/RFID markers. In other instances, underground hazards 204 are not easily identifiable and, as such, operator 350 can have underground hazards 204 emphasized in their field of view. For example, this can be done by superimposing a graphic over their field of view at the hazard's position. For instance, in a case where the underground hazard 204 is an underground gas line, a line may be generated and overlaid on the operator's field of view to show where the line lies underground.

As shown, on-ground hazard 206 is an electrical box, however there may be other types of on-ground hazards 206 as well, such as but not limited to electrical cords, hoses, work equipment, etc. In some instances, on-ground hazard 206 is clearly visible to an operator. However, in other instances, on-ground hazard 206 is less visible to an operator. For example, objects at worksites often accumulate dust from their surroundings that may cause, an otherwise highly visible object, to blend in with the ground proximate their location. In a similar instance, it may be beneficial to the operator to have the ground hazard emphasized in their field of view. For example, this can be done by superimposing or overlaying a graphic over their field of view at the hazard's position. For instance, in a case where the on-ground hazard 206 is a dust covered electrical box, a bounding box may be generated in the operator's field of view around the electrical box to emphasize to the operator the location of the electrical box. Additionally, the visual assistance system may superimpose a distance to the electrical box, proximate the electrical box in the field of view of the operator.

As shown, work machine 208 is a boom lift. However, in another worksite there may be many other types of machines operating at the worksite. Typically, work machine 208 would have some highly visible portions (e.g., safety yellow paint, retroreflective markers, lights, etc.). However, in some examples, work machine 208 may be less than highly visible to the operator. In this instance, it may be beneficial to the operator to have work machine 208 visually emphasized. For instance, a visual assistance system may superimpose or overlay a bounding box around work machine 208 on a field of view of the operator to emphasize to the operator where the machine is. Additionally, the visual assistance system may superimpose or overlay a distance to work machine 208 proximate work machine 208 in the field of view of the operator.

Also, at any worksite there may be many people moving about completing tasks.

The people in worksite 100 are represented by an example worker 210. Workers are often required to wear high visibility clothing (e.g., road vests or high visibility colored clothing). However, in some cases, people 210 may be less than highly visible to an operator of work machine 102. In this instance, it may be beneficial to the operator to have people 210 visually emphasized. For instance, a visual assistance system may superimpose or overlay a bounding box around people 210 on a field of view of an operator to emphasize to the operator where people 210 are.

Additionally, an avoidance control system can be provided to automatically prevent the operator from controlling work machine 102 in such a way that would cause a collision between work machine 102 and another object.

Figure 2:
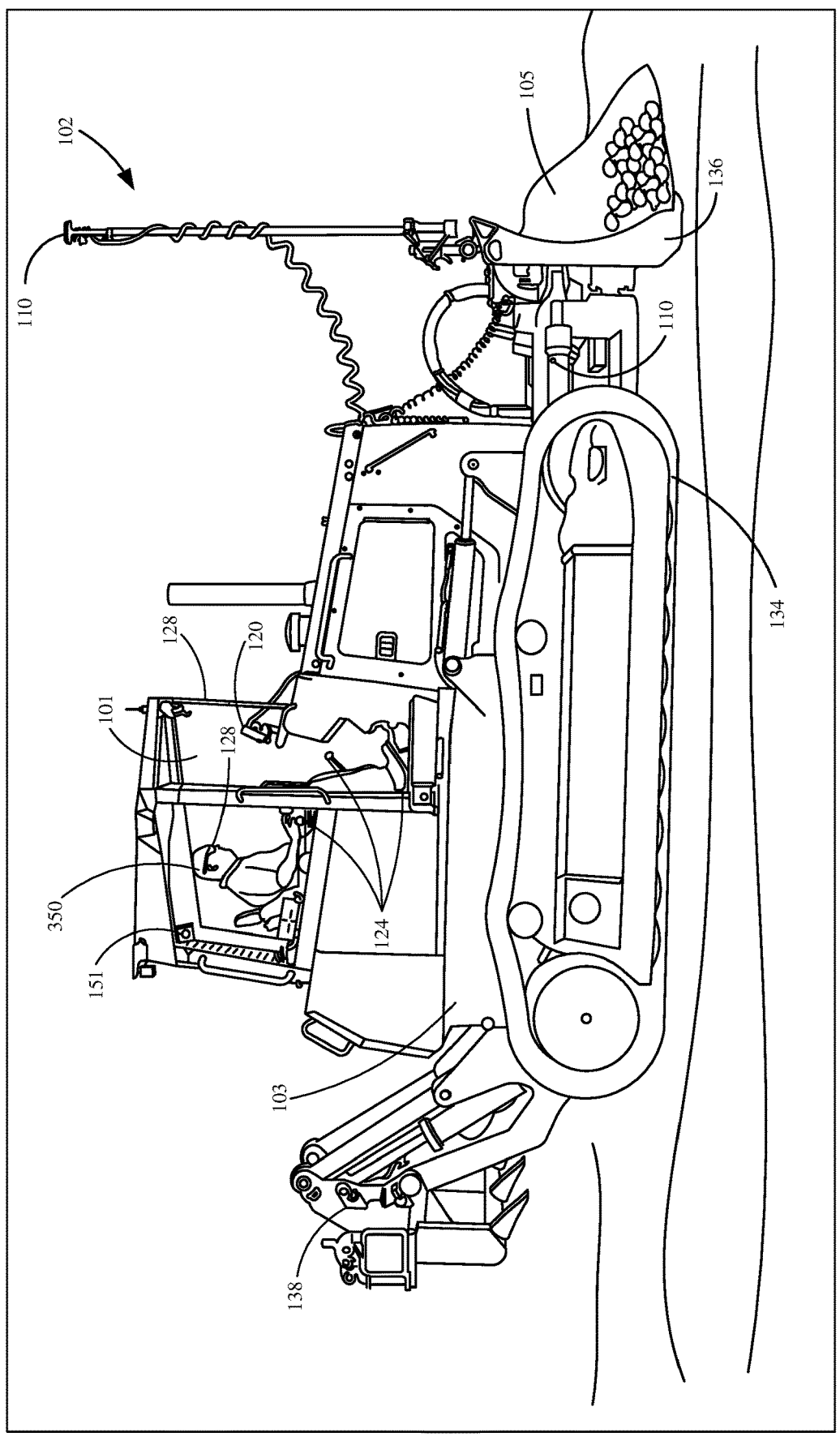
FIG. 2 is a side view showing one example of a work machine in a worksite.

FIG. 2 is a side view showing one example work machine 102 in a worksite 100.

Work machine 102 illustratively includes operator cab 101, frame 103, sensors 110, blade 136, ground engaging elements 134 and ripper 138.

Work machine 102 is often operated by an operator in operator cab 101. However, in some instances, work machine 102 may operate at different levels of autonomy, where an operator cab 101 is not necessary. Operator cab 101 includes mechanical user interface mechanisms 124 (e.g., levers, pedals, steering wheels, etc.). Operator cab 101 also includes operator sensor 151 that senses a position or other characteristics of operator 350 in the operator cab 101. For example, operator sensor 151 can determine a position of operator 350 relative to augmented display 128. As another example, operator sensor 151 can detect which direction that operator 350 is looking. Operator cab 101 can also include augmented display devices 128. Augmented displays can, for example, be head-mounted or window mounted. Operator cab 101 can also include standard display devices 120, such as an LCD or LED screen. Operator cab 101 and its components are supported by a frame 103.

Frame 103 also supports and/or is operably coupled to blade 136, ground engaging elements 134 and ripper 138. Blade 136 is controlled by operator 350 to move or push material 105. Ground engaging elements 134 drive and direct movement of work machine 102 about worksite 100. Ground engaging elements 134, as shown are tracks, however in other examples ground engaging elements 134 may include other mechanisms as well, such as wheels. Ripper 138 can be controlled by operator 352 to till or rip a surface of worksite 100. Ripper 138 is also sometimes used to extract large rocks, stumps or other objects from a surface of worksite 100.

To aid in operation of work machine 102 there may be sensors 110 to sense various aspects of operation. Some examples of sensors 110 include visual sensors, hydraulic strain gauges, pressure gauges, linear displacement transducers, hall effect sensors, potentiometers, odometers, fuel gauges, global positioning system (GPS) receivers, compasses, gyroscopes, accelerometers, etc. For example, as shown, there is a position sensor used to sense the location of work machine 102. There is also a linear displacement transducer (LDT) mounted on a hydraulic cylinder coupled to blade 136 which can be used to sense the angular position of blade 136, relative to frame 103.

Figure 3A:
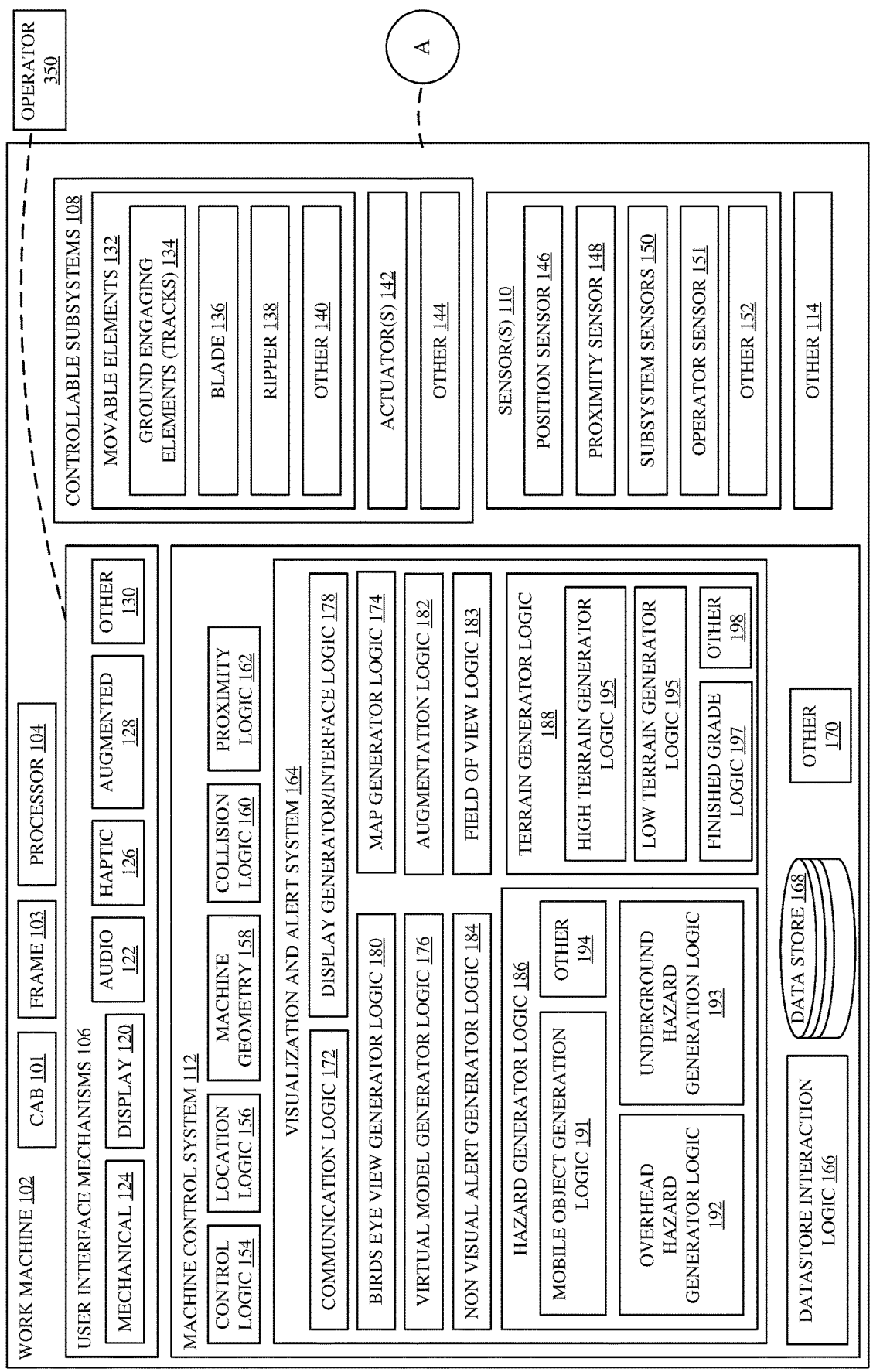
FIGS. 3A and 3B (collectively referred to herein as FIG. 3) show a block diagram showing one example of a worksite architecture.
Figure 3B:
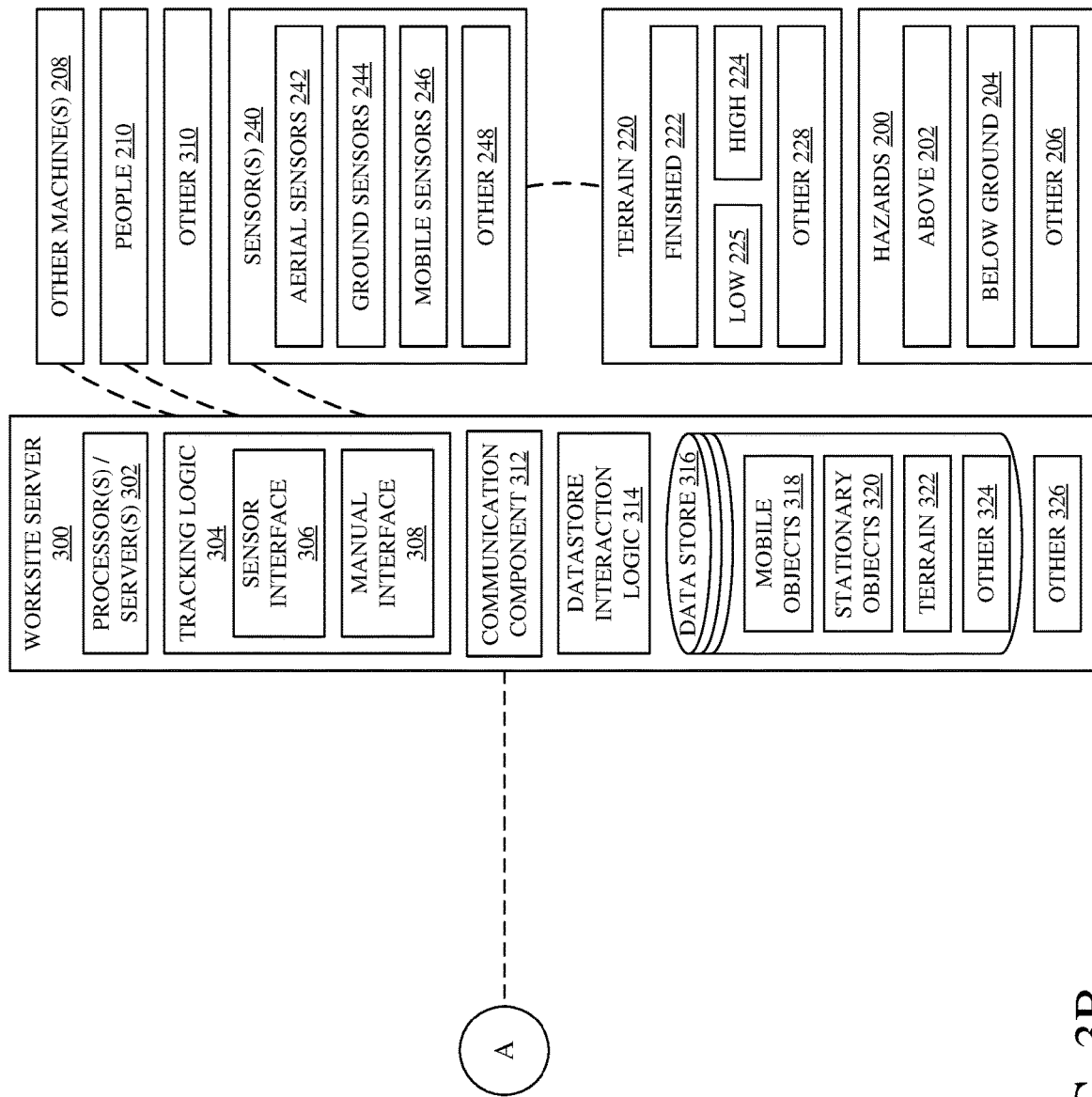

FIGS. 3A and 3B (collectively referred to herein as FIG. 3) show a block diagram showing one example of worksite 100. Worksite 100 comprises work machine 102, hazards 200, work machines 208, people 210, terrain 220, sensor(s) 240 and worksite server 300. Each component will be described in greater detail below.

Briefly, work machine 102, hazards 200, other work machines 208, people 210 and sensors 240 are all equipped with components that are coupled to worksite server 300. Worksite server 300 receives information from these components of worksite 100 and sends information back to these components.

Work machine 102 includes operator cab 101, frame 103, processor 104, user interface mechanisms 106, controllable subsystems 108, sensors 110, machine control system 112 and can include other components as well as indicated by block 114. Frame 103 operably couples to and/or supports other components of work machine 102.

User interface mechanisms 106 allow operator 350 to control and interact with work machine 102. As shown, user interface mechanisms 106 can include display devices 120, audio mechanisms 122, mechanical user interface mechanisms 124, augmented display devices 128, haptic devices 126 and can include other mechanisms as well as indicated by block 130. Display devices 120 can include analog gauges, electronic displays, LED displays, etc. Audio mechanisms 122 can include speakers, microphones, voice command components, etc. Mechanical user interface mechanisms 124 can include levers, pedals, steering wheels, etc. Augmented display devices 128 can include augmented displays, including head-mounted displays and/or cab mounted displays (e.g., window mounted head up displays). Haptic devices 126 can include touchscreens, touchpads, etc. Some examples of other user interface mechanisms, represented by block 130, may include eye tracking devices, operator position sensors, etc.

Work machine 102 includes a variety of controllable subsystems 108, briefly described above. Each controllable subsystem 108 comprises a movable element 132, an actuator 142 and can include other items as well as indicated by block 144. Movable elements 132 illustratively include ground engaging elements 134, blade 136, and ripper 138, but can include other items as well as indicated by block 140. Actuators 142 receive control signals from machine control system 112 or in some cases, directly from user interface mechanisms 106. In response to receiving these control signals, actuators 142 actuate their respective movable element 132.

For example, ground engaging elements 134 can include tracks, wheels, rollers, etc. Ground engaging elements 134 are typically actuated by an actuator 142 that includes an engine, transmission and drivetrain.

As another example, blade 136 is actuated by more than one actuator 142 that include hydraulic cylinders. In some examples, blade 136 is a "six-way blade" that can actuate in six different directions. Ripper 138 may be actuated by an actuator 142 that includes hydraulic cylinders.

To monitor various aspects of work machine 102, a variety of different sensor(s) 110 can be provided. Sensor(s) 110 illustratively include position sensor 146, proximity sensor 148, subsystem sensors 150, and operator sensor 151, but can include other sensors as well, as indicated by block 152.

Position sensor(s) 146 senses a location (and possibly an orientation) of work machine 102 in worksite 100. Position sensor(s) 146 can include a global positioning system receiver, local triangulation device, a lidar or radar device, altimeter, tilt sensor, etc.

Proximity sensor 148 senses an area proximate work machine 102 for external objects. Proximity sensor 148 can include a lidar or radar device, capacitance sensing device, camera, or another type of proximity sensing device. For example, a camera or stereo camera can be used to locate and identify objects proximate work machine 102.

Subsystem sensor 150 senses a characteristic of one or more controllable subsystems 108. Subsystem sensors 150 can include pressure or strain gauges, linear displacement transducers (LDT), potentiometers, a tachometer, an odometer, a timer, etc. Subsystem sensors 150 may generate sensor signals useful for feedback loop control of work machine 102. For example, a LDT can be used to more precisely control the movement of blade 136.

Operator sensor(s) 151 sense a characteristic or location of operator 350 in operator cab 101. Operator sensor(s) 151 can include position sensors, orientation sensors, eye tracking sensors, etc. Operator sensor(s) 151 may generate sensor signals useful for generating augmented displays on augmented display device 128. For example, to properly augment the view of operator 350, such that generated indications appear in the correct locations (or perspective), it is helpful to know where the eyes of operator 350 are positioned and oriented (relative to the augmented display device 128).

Machine control system 112 includes control logic 154, location logic 156, machine geometry logic 158, collision logic 160, proximity logic 162, visualization alert system 164, datastore interaction logic 166, datastore 168 and can include other items as well as indicated by block 170. Functionality of the logic components of machine control system 112 can be executed by processor 104 or a different processor. The logic components of machine control system 112 will be described in greater detail with respect to FIG. 4.

Briefly, control logic 154 generates control signals to control the actuators 142 of controllable subsystems 108. During an operator-controlled operation, control logic 154 can be operably coupled to user interface mechanisms 106 and, in response to operator 350 interacting with a user interface mechanism 106, control logic 154 generates a control signal that actuates an actuator 142. For instance, if operator 350 forwardly actuates a lever of user interface mechanisms 106, control logic 154 can generate a control signal to control actuator 142 to drive ground engaging elements 134 forward. During an autonomous operation, control logic 154 can be operably coupled to one or more sensors 110 and other logic components to generate control signals that control work machine 102 and controllable subsystems 108 autonomously.

Location logic 156 receives sensor signals from sensors 110 and determines a location of work machine 102. This location can be relative to an object in worksite 100 or can be a more absolute value (such as GPS coordinates). The position of work machine 102 can be useful in determining if work machine 102 will collide with another object. For example, if work machine 102 is determined to be at a location and another object is at the same (or proximate) geographic location, there may be a collision between work machine 102 and the object (there may not be a collision in some cases where the object is vertically above or below work machine 102).

Machine geometry logic 158 retrieves physical dimensions of work machine 102 and its controllable subsystems 108, and sensor signals from sensors 110. Machine geometry logic 158 uses this data to determine the pose of work machine 102 (e.g., the orientation and positions of work machine 102 and all of its controllable subsystems 108). The pose of work machine 102 can be useful in determining if a portion of work machine 102 will collide with another object. For example, work machine 102 in a pose where blade 136 is lifted may not collide with a below ground hazard, however, work machine 102, at the same location, in a pose where blade 136 is lowered, and cutting into the ground, may collide with the below ground hazard.

Collision logic 160 is operably or communicatively coupled to control logic 154, location logic 156, machine geometry logic 158 and a source of external object locations (e.g., worksite server 300) to gather information used to determine if work machine 102 will collide with another object. Before control logic 154 sends a control signal to actuator 142, collision logic 160 determines if the potential action will cause a collision with an external object and, if so, prevent the actuating signal from being sent. For example, collision logic 160 can simulate the requested actuation and determine if the actuation will cause an intersection of objects. If so, there will be a collision and the actuation is prevented.

Similar to collision logic 160, proximity logic 162 is coupled to control logic 154, location logic 156, machine geometry logic 158 and the source of external object locations (e.g., worksite server 300). Proximity logic 162, however, determines that work machine 102 is within a threshold distance of an external object and prevents work machine 102 from moving within a threshold distance of an object. For example, a threshold distance from a person may be 5 feet. Accordingly, proximity logic 162 prevents work machine 102 from moving any closer than 5 feet from any person on worksite 100.

Datastore interaction logic 166 retrieves and stores data within datastore 168.

Visualization alert system 164 includes communication logic 172, virtual model generator logic 176, display generator logic 178, bird's eye view generator logic 180, augmentation interface generator logic 182, nonvisual alert generator logic 184, hazard generator logic 186, terrain generator logic 188 and can include other items as well, as indicated by block 189. Communication logic 172 communicates with worksite server 300 or other components of worksite 109. For example, communication logic 172 can retrieve data from, worksite server 300, indicative of the locations of objects external to work machine 102 (e.g., other work machines 208, people 210, hazards 200, etc.) in worksite 100.

Map generator logic 174 uses the data retrieved by communication logic 172 to generate a two-dimensional map of worksite 100 and the objects within worksite 100. Virtual model generator logic 176 expands on the map generated by map generator logic 174, with additional data from worksite server 300, to create a three-dimensional virtual model of the worksite 100. For example, a three-dimensional model includes data not only of an object's geographic location, but also its location above or below ground. Display generator logic 178 can display either the map generated by map generator logic 174 or the virtual model generated by virtual model generator logic 176 on a display device.

Bird's eye view generator logic 180 generates and displays an interface that shows a bird's eye view of work machine 102 and the objects within a given threshold distance of work machine 102. Bird's eye view generator logic 180 generates the bird's eye view interface by accessing either the map generated by map generator logic 174 or the model generated by virtual model generator logic 176.

Bird's eye view generator logic 180 can scale the view of the bird's eye view interface to include or exclude an area proximate work machine 102. For example, if work machine 102 is operating at high speeds, bird's eye view generator logic 180 can scale out the bird's eye view to include objects further away from work machine 102. Or, for example, if work machine 102 is operating in a tight space where precision is important, bird's eye view generator logic 180 may scale down the bird's eye view to include objects only very proximate to work machine 102 with a high degree of precision. An example of a bird's eye view is described in greater detail with respect to FIG. 7.

Field of view logic 183 determines which way operator 350 is looking and what components are within a field of view of operator 350 and what components are outside of the field of view of operator 350. To determine which way operator 350 is looking, field of view logic 183 can receive sensor signals from operator sensor 151. For example, operator sensor 151 can be a compass and gyroscope coupled directly or indirectly to the head of operator 350 (e.g., on a piece of headwear or eyewear). After field of view logic 183 determines which way operator 350 is looking, using geometry, a field of view can be determined based on the direction operator 350 is looking. Once the field of view is determined, objects within this field of view are identified and the remaining objects are determined to be outside the field of view.

Augmentation interface generator logic 182 generates and displays an augmented interface over the view of operator 350 of worksite 100, such that the normal field of view of operator 350 is augmented, overlaid or super-imposed with additional visual objects. For example, augmentation interface generator logic 182 can generate an interface on a virtual reality headset that operator 350 wears and looks through. In another example, augmentation interface generator logic 182 can generate an interface on a window surface of operator cab 101 that operator 350 looks through. Augmentation interface generator logic 182 is operably coupled to hazard generator logic 186 and terrain generator logic 188 and displays data received from, and generated by, these logic components. For example, augmentation interface generator logic 182 receives hazard data from hazard generator logic 186 and displays an interface object on the augmented display 128 that corresponds to the hazard (e.g., a bounding box around the hazard, which may also indicate the type of hazard).

To generate indications of hazards to be displayed on an augmented display 128, hazard generator logic 186 retrieves hazard positions from worksite server 300. Hazard generator logic 186 can discriminate which hazards to generate indications for based on the location of work machine 102. For example, hazards that are very far away from work machine 102, in some instances, need not be displayed because there is no danger of collision with those hazards. Hazard generator logic 186 can also discriminate which hazards to generate indications for, based on the field of view of operator 350. For example, hazards that are not within a field of view of operator 350, in some instances, need not be generated or displayed because there is no portion of augmented display 128 to display the indication (because it is out of the operator's field of view). However, in some instances, hazard generator logic 186 generates an indication of a hazard outside of the field of view of operator 350 and then places the indication at a peripheral location in the field of view of operator 350 (on augmented display device 128) to alert operator 350 to look in that direction to see the indication of the hazard. For example, if operator 350 was looking to the side, given that other work machine 208 in front of work machine 102 was out of the field of view of operator 350, an indication (e.g., arrow with a caution sign) can be generated in a peripheral portion of the field of view of operator 350, alerting operator 350 to look forward in the direction of work machine 208. Hazard generator logic 186 includes mobile object generator logic 191, overhead hazard generator logic 192, underground hazard generator logic 193 and can include other items as well, as indicated by block 194.

Mobile object generator logic 191 accesses a model generated by virtual model generator logic 176 to retrieve mobile object data 318 regarding the locations of the objects in worksite 100. Mobile object generator logic 191 then utilizes field of view logic 183 to determine if the object is within a field of view of operator 350 (or is otherwise of importance to emphasize to operator 350). Once the object is identified as of importance, mobile object generator logic 191 generates an interface indication, indicative of the mobile object. For example, mobile object generator logic 191 generates an interface indication that outlines the object (in the natural field of view of operator 350) with a specific color (e.g., based on the type of mobile object, visibility or on how far away the object is, etc.).

Overhead hazard generator logic 192 accesses a model generated by virtual model generator logic 176 to retrieve object data 318 regarding the locations of the overhead hazards in worksite 100. Overhead hazard generator logic 192 then utilizes field of view logic 183 to determine if the overhead hazard is within a field of view of operator 350 (or is otherwise of importance to emphasize to operator 350). Once the overhead hazard is identified as of importance, overhead hazard generator logic 192 generates an interface indication, indicative of the overhead hazard. For example, overhead hazard generator logic 192 generates an interface indication that outlines the overhead hazard (in the natural field of view of operator 350) with a specific color (e.g., based on the type of overhead hazard, the visibility or based on how far away the object is, etc.). In another example, overhead hazard generator logic 192 generates an interface indication that is at a peripheral in the natural field of view of operator 350, and prompts operator 350 to look in the direction of the interface indication.

Underground hazard generator logic 193 accesses a model generated by virtual model generator logic 176 to retrieve object data 318 regarding the locations of the underground hazards in worksite 100. Underground hazard generator logic 193 then utilizes field of view logic 183 to determine if the underground hazard's location is within a field of view of operator 350 (or is otherwise of importance to emphasize to operator 350). Once the underground hazard is identified as of importance, underground hazard generator logic 193 generates an interface indication, indicative of the underground hazard. For example, underground hazard generator logic 193 generates an interface indication that outlines the underground hazard (in the natural field of view of operator 350) with a specific color (e.g., based on the type of underground hazard, the visibility or based on how far away the object is, etc.). In another example, underground hazard generator logic 193 generates an interface indication that is at a peripheral in the natural field of view of operator 350, and prompts operator 350 to look in the direction of the interface indication, such that the indication will be displayed on the location in the natural field of view of operator 350 rather than at a peripheral location.

Terrain generator logic 188 includes high terrain generator logic 195, low terrain generator logic 196, finish grade logic 197 and can include other items as well, as indicated by block 198. High terrain generator logic 195 accesses a model generated by virtual model generator logic 176 and a finish grade value to determine which portions of the surface of worksite 100 are above grade. Once the portions are identified by high terrain generator logic 195 generates an interface indication, indicative of the above grade portion. For example, high terrain generator logic 195 generates an interface indication that is a specific color based on how far above grade the portion is (e.g., light red can indicate the portion is just above grade level and darker shades of red can indicate the portion is further above grade level).

Low terrain generator logic 196 accesses a model generated by virtual model generator logic 176 and a finish grade value to determine which portions of the surface of worksite 100 are below grade. Once the portions are identified, low terrain generator logic 196 generates an interface indication, indicative of the below grade portion. For example, low terrain generator logic 196 generates an interface indication that is a specific color based on how far below grade the portion is (e.g., light blue can indicate the portion is just below grade level and darker shades of blue can indicate the portion is further below grade level).

Finish grade logic 197 accesses a model generated by virtual model generator logic 176 and a finish grade value determine which portions of the surface of worksite 100 are at finish grade. Once the portions are identified, finish grade logic 197 generates an interface indication, indicative of the at grade portion. For example, finish grade logic 197 generates an interface indication that is a specific color (e.g., green) based on the portion being at the correct grade. In another example, finish grade logic 197 removes a color previously set, at a given portion, by high terrain generator logic 195 or low terrain generator logic 196, such that portions that were previously above or below grade and were indicated by color, but that are now determined to be at the correct finish grade, are not represented by a color or emphasized.

Nonvisual alert generator logic 184 can generate nonvisual alerts (e.g., audible, haptic, etc.). For example, nonvisual alert generator logic 184 can access a model generated by virtual model generator logic 176 and determine where objects are in the worksite relative to work machine 102. If an object is within a threshold distance of work machine 102, nonvisual alert generator logic 184 can generate one or more nonvisual alerts (e.g., a verbal warning or a vibration).

Worksite server 300 includes processors/server 302, tracking logic 304, communication component 312, Datastore interaction logic 314, data store 360 and can include other items as well as indicated by block 326. Processor(s)/server(s) 302 can execute the functions of the logic components in worksite server 300 described in greater detail below.

Tracking logic 304 operates to track the locations of objects in worksite 100 and update data store 316 with current location data. For example, work machines 102 and 208, hazards 200 and people 210. Tracking logic 304 also operates to track the terrain of worksite 100. For example, tracking logic 304 can track which portions of the surface of worksite 100 are above, below or at finish grade. To track these components of worksite 100, tracking logic 304 includes sensor interface 306 and manual interface 308.

Sensor interface 306 interfaces with sensors 240 and/or sensors 110 to automatically (via sensors) monitor objects and terrain in worksite 100. For example, sensor interface 306 can be coupled to a drone mounted lidar system (e.g., aerial sensor 242) that continually scans a surface of worksite 100. The scanned data can be saved in data store 316 as terrain data, via sensor interface 306. As another example, sensor interface 306 can be coupled to mobile devices, of one or more people 210, that include a global positioning system receiver. The mobile devices provide sensor interface 306 a current position of people 210. Sensor interface 306 can then update the locations of people 210 in data store 316. As another example, utilities information may be retrieved from databases of utility formation (e.g., provided by various utility companies).

Manual interface 308 allows operator 350, people 210 or other users to manually enter characteristics of objects and/or terrain in worksite 100. For example, a surveying crew may survey a worksite and input a map of the terrain of worksite 100 in data store 316 via manual interface 308. As another example, manual interface 308 can retrieve, from an external source, data indicative of the locations of various above and below ground utilities.

Communication component 312 allows worksite server 300 to communicate with other components in worksite 100 and external to worksite 100. Communication component 312 can include a wide area network adapter, local area network adapter, wireless adapter, wired adapter, etc.

Datastore interaction logic 314 allows interaction with data store 316 (e.g., storing or retrieving data). Data store 316 can store a variety of information on worksite 100 and the objects/terrain of worksite 100. Illustratively shown, data store 316 includes mobile object data 318, stationary object data 320, terrain data 322 and can include other data as well, as indicated by block 324.

Mobile object data 318 includes data related to the various objects in worksite 100 (e.g., work machine 102, other work machines 208, operator 350, hazards 200, etc.). Specifically, mobile object data 318 can include position data identifying positions of the objects in worksite 100. For example, this can include the GPS coordinates or local coordinates of the objects and/or the vertical portion of the object relative to the ground. Position data for the objects in worksite 100 can be used by collision logic 160 (or similar logic components in other objects) to avoid collisions between objects.

Additionally, mobile object data 318 can include the dimensions of the objects in worksite 100. For example, the physical dimensions of an object. For instance, work machine 102, in one example, is 13 feet long by 8 feet wide by 9 feet high. Dimensions of objects in worksite 100 can be used by collision logic 160 (or similar logic components in other objects) to prevent collisions between objects.

Also, mobile object data 318 can include pose data of the objects in worksite 100. For example, pose data for an object includes positions and dimensions of its components. For instance, pose data for work machine 102 can include the positions of blade 136 and ripper 138 relative to frame 103 and/or other components. Pose data of objects in worksite 100 can be used by collision logic 160 (or similar logic components in other objects) to prevent collisions between objects with greater precision than standard dimensions alone. For example, work machine 102 in one pose at a given location may not cause a collision, but work machine 102 in a different pose at the same location, may cause a collision.

Mobile object data 318 can also include a speed and direction of movement of objects in worksite 100. For example, the speed and direction of work machine 208 may be 3 miles/hour at 120 degrees. Of course, these are only examples and mobile object data 318 can include other information on the objects in worksite 100 as well.

Stationary object data 320 includes data related to the various objects in worksite 100 (e.g., stationary hazards 200, various equipment, buildings, barricades, etc.). Specifically, stationary object data 320 can include position data for the various stationary objects in worksite 100. For example, the GPS coordinates or local coordinates of the objects and/or the vertical portion of the object relative to the ground. Position data of the objects in worksite 100 can be used by collision logic 160 (or similar logic components in other objects) to avoid collisions with objects.

Additionally, stationary object data 320 can include the dimensions of the objects in worksite 100, for example, the physical dimensions of an object. For instance, a stationary object that is a utility pole, in one example, is 13 feet high and 1 foot in diameter. Dimensions of stationary objects in worksite 100 can be used by collision logic 160 (or similar logic components in other objects) to avoid collisions between work machine 102 and stationary objects.

Terrain data 322 includes data related to the various surfaces, ground or terrain in worksite 100. Specifically, terrain data 322 can include position and height data of the various surfaces in worksite 100. For example, it can include the GPS coordinates or local coordinates of a portion of the surface and/or the altitude or height of the portion of the surface. Position and height data for the surface in worksite 100 can be used by control logic 154 (or similar logic components in other objects) to autonomously control the grading operations of work machine 102. For example, when given an accurate enough map of the surfaces of worksite 100, control logic 154 can autonomously control ground engaging elements 134 and blade 136 of machine 102 to grade the surface of worksite 100 to a given grade.

Position and height data for the surfaces of worksite 100 can be used by terrain generator logic 188 to generate indications of the height of the various surfaces of worksite 100 to operator 350. For example, terrain generator logic 188 can generate indications of height based on color. For instance, a color gradient can be established between two colors where one color represents the lowest point and the second color represents the highest point and halfway between the two colors represents the correct finish grade.

Sensors 240 are illustratively coupled to worksite server 300 and various other components of worksite 100. Sensors 240, as shown include aerial sensors 242, ground sensors 244, and machine mounted sensors 246. However, sensors 240 can include other sensors as well as indicated by block 248.

Aerial sensors 242 can be mounted on an aerial machine (e.g., a drone, plane, etc.) or high structure (e.g., a building, tower, etc.). Some examples of aerial sensors 242 can include lidar, an image sensor, radar, etc. Aerial sensors 242 can be used for a variety of different purposes. For example, aerial sensors 242 can track the locations of objects and hazards in worksite 100. In another example, aerial sensors 242 can sense the height of surfaces in worksite 100. For instance, aerial sensors 242 can continually sense the height of the surfaces in worksite 100 while machine 102 is grading the surface. This way, as machine 102 grades the surface, the terrain data 322 is continually updated by aerial sensors 242 and as such, terrain generator logic 188 can alert operator 350 of the current height of surfaces in worksite 100.

Ground sensors 244 are located at or near ground level. Some examples of ground sensors can include an image sensor, a global positioning system receiver, proximity sensors, etc. Ground sensors 244 can be used for a variety of different purposes. For example, ground sensors 244 can track locations of objects and hazards in worksite 100.

Mobile sensors 246 are mounted on various machines or other mobile objects in worksite 100. Some examples of mobile sensors can include an image sensor, lidar, proximity sensors, etc. Mobile sensors 246 can be used for a variety of different purposes. For example, mobile sensors 246 can track locations of objects and hazards in worksite 100. As another example, mobile sensors 246 can sense height of surfaces of worksite 100. For instance, mobile sensors 246 can be mounted on machine 102 rearward of its direction of travel, to continually sense the height of the surfaces of worksite 100 while machine 102 is grading a surface. This way, as machine 102 grades the surface, the terrain data 322 is continually updated by mobile sensors 246, and as such, terrain generator logic 188 can alert operator 350 the current height of the surfaces in worksite 100. Terrain data 322 can also include other data on the surfaces of worksite 100, for example, the type of soil or material that comprises the surface. This may be useful in grading control or calculations (e.g., productivity or spillage).

Terrain 220 illustratively includes finished surfaces 222, above grade surfaces 224 and below grade surfaces 225, explained above. However, there may be other types of surfaces as well as indicated by block 228. Hazards 200, above-ground hazards 202 and below ground hazards 204 are explained above. However, there may be other hazards as well, as indicated by block 206.

Figure 4:
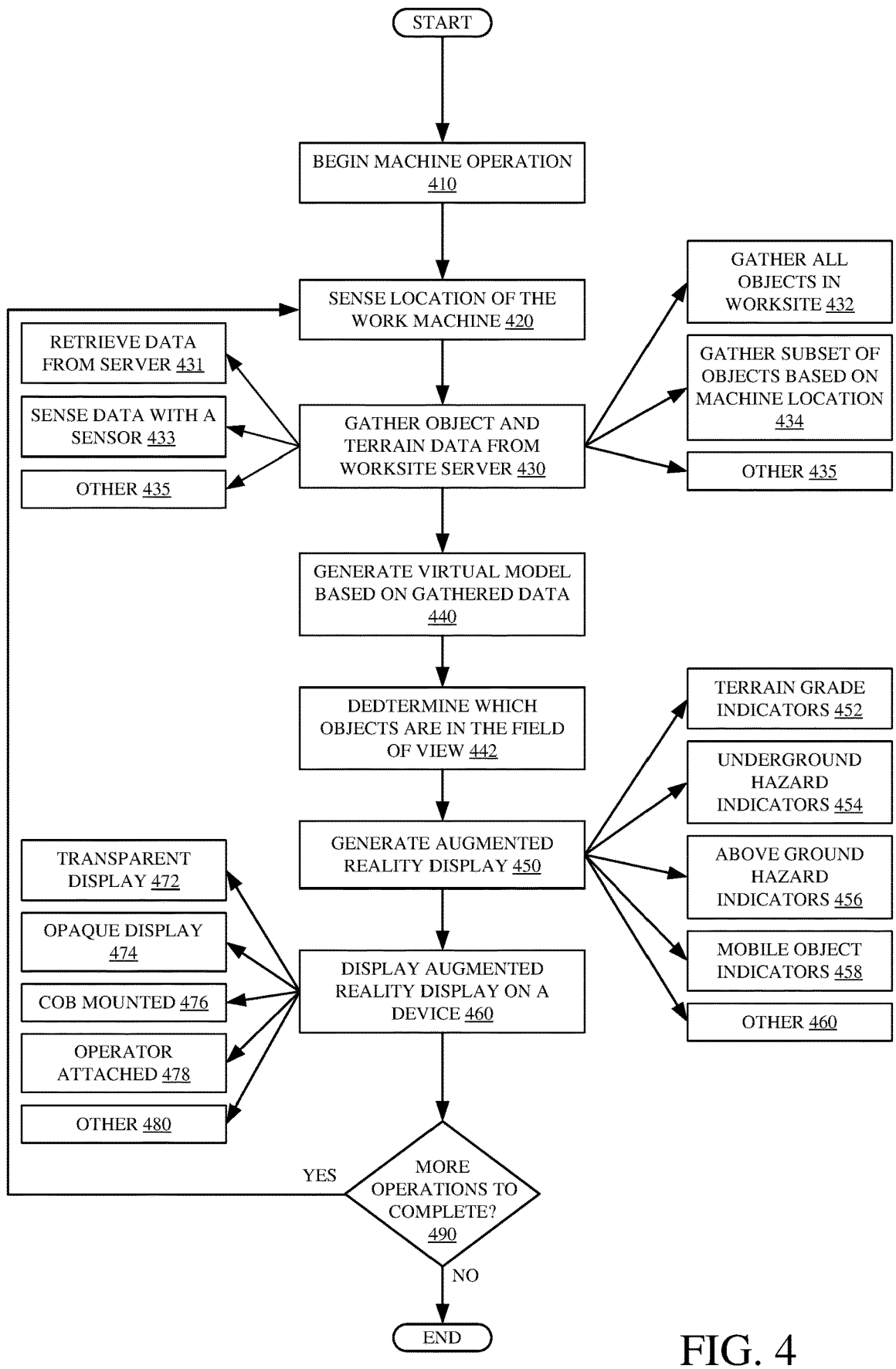
FIG. 4 is a flow diagram showing one example of a work machine operation.

FIG. 4 is a flow diagram showing one example of a work machine 102 operation at worksite 100. Operation 400 begins at block 410, where work machine 102 begins to operate at worksite 100 (e.g., operator 350 enters work machine 102 and powers on work machine 102).

Operation 400 proceeds at block 420, where a location of work machine 102 is sensed with position sensor 146. As discussed above, position sensor 146 can include a GPS receiver or a more local position sensor.

Operation 400 proceeds at block 430 where object and terrain data is gathered by machine control system 112. The type of data gathered can include the data described above with respect to data store 316. As indicated by block 431, the object and terrain data can be retrieved from a server. For example, the data is retrieved from worksite server 300 through a wireless connection. As indicated by block 433, the object and terrain data can be sensed by a sensor. For example, a lidar or image-based sensor on work machine 102 can sense the object and terrain data. As indicated by block 435, the object and terrain data can be gathered from a local data store or in other ways as well.

As indicated by block 432, data relating to all objects/terrain in worksite may be gathered. As indicated by block 434, data related to a subset of objects/terrain in worksite may be gathered. For example, the subset can be chosen based on the location of work machine 102 and worksite 100 (e.g., it may only be desired to gather information objects within a threshold distance of a work machine 102 because objects further than a threshold distance away from work machine 102 are determined to have a negligible effect on the operation of work machine 102). As another example, the subset can be chosen based on the field of view of operator 350 (e.g., it may only be desired to gather information on objects/terrain within the view of operator 350 because these are the objects/terrain that may be emphasized on augmented display 128). Further, it may be that the subset is closer based on the type of machine 102 on the type of operation it is performing. If it is a ground moving machine that is relatively small and performing a grading operation, the subset may not include overhead objects. However, if it is a taller machine (such as an excavator) that extends a farther distance into the air, then the overlaid objects may be included in the subset. As indicated by block 346, other data can be gathered as well.

Operation 400 then proceeds at block 440, where virtual model generator logic 176 generates a virtual model based on the retrieved data. For example, virtual model generator logic 176 generates a three-dimensional model of worksite 100 based on the terrain data. In one example, the terrain of worksite 100 is represented by an object (e.g., a mesh corresponding to the non-flat surface of worksite 100). Virtual model generator logic 176 can also populate the three-dimensional model of worksite 100 with objects from the object data. Virtual model generator logic 176 can also populate the three-dimensional model of worksite 100 with the location of work machine 102. In one example, a virtual model does not include a graphical interface but instead includes a database of object dimensions and/or locations.

Operation 400 then proceeds at block 442, where field of view logic 183 determines which objects are in the field of view of operator 350. For example, field of view logic 183 is operably coupled to operator sensor 151. Operator sensor 151, in this example, can be a system of sensors including an eye tracking device, compass, gyroscope, etc. Using the sensor outputs from operator sensor 151, field of view logic 183 can determine which direction that operator 350 is looking. Field of view logic 183 then can access the virtual model generated at block 440 and determine which objects are in the field of view of operator 350.

Operation 400 then proceeds at block 450 where visualization alert system 164 generates an augmented reality display including a variety of augmented display components that correlate to objects within the field of view of operator 350 or objects that have some other significance. For example, an overhead power hazard may have significance because operator 350 may pilot work machine 102 into a collision with this hazard even though it is out of their field of view. As indicated by block 452, terrain generator logic 188 generates augmented display components relating to the terrain of worksite 100. For example, an augmented display component relating to terrain may include a colored shape emphasizing a portion of the worksite surface that is above or below final finish grade.

As indicated by block 454, underground hazard generator logic 193 generates augmented display components relating to underground hazards of worksite 100. For example, an augmented display component relating to an underground hazard may include a bounding box or shape emphasizing the location of the underground hazard. For instance, since the underground hazard is not visible, a shape corresponding to the actual appearance of the underground hazard and text describing the hazard, may be generated by underground hazard generation logic 190 (see reference number 504 in FIG. 5).

As indicated by block 456, overhead hazard generator logic 192 generates augmented display components relating to overhead hazards in worksite 100. For example, an augmented display component relating to an overhead hazard may include a bounding box or shape emphasizing the location of the overhead hazard. As another example, where the hazard is not within the field of view of operator 350, an indication may be generated that indicates to operator 350 to look in the direction of the hazard (e.g., an arrow pointing up).

As indicated by block 458, mobile object generator logic 191 generates augmented display components corresponding to mobile objects in worksite 100. For example, an augmented display component relating to a mobile object can include a bounding shape, outline, or color fill emphasizing the location of the mobile object.

Operation 400 then proceeds at block 470 where augmentation interface generator logic 182 displays the augmented reality display onto a display device. As indicated by block 472, the display may be a transparent display device. For example, a transparent display device can include one or more windows of operator cab 101. As another example, a transparent display device can include glasses, goggles, visor or another head-mounted device worn by operator 350. As indicated by block 474, the display device may be an opaque display device. For example, an opaque display device can include an LCD or LED screen. In this latter example, the augmented display device components are superimposed over a live video feed from an image sensor mounted on work machine 102.

As indicated by block 476, the display device may be mounted on operator cab 101. For example, the windows of operator cab 101. As another example, a digital display device screen (e.g., LCD, LED etc.) mounted on a dashboard of operator cab 101.

As indicated by block 478, the display device may be attached to operator 350 in some manner. For example, the display device may be on a pair of glasses worn by operator 350. As another example, the display device may be a digital display device that is part of a virtual reality headset. As indicated by block 478, the display device may be made or mounted in other ways as well.

At block 490, it is determined whether there are more operations for work machine 102 to complete. If there are no more operations for work machine 102 to complete, then operation 400 ends. If there are more operations for work machine 102 to complete, operation 400 proceeds at block 420.

Figure 5:
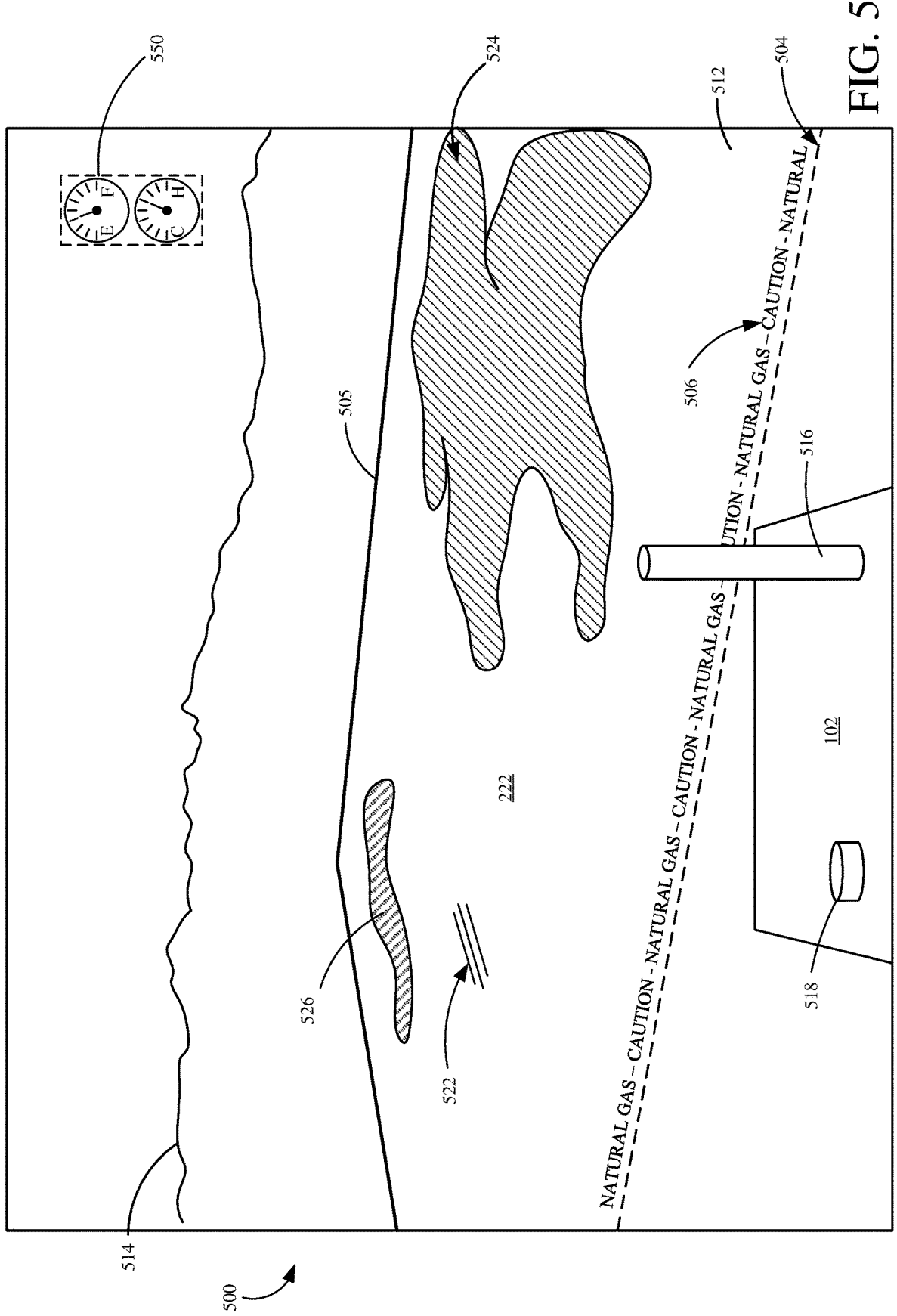
FIG. 5 is one example showing an augmented view of a field of view on an operator.

FIG. 5 shows one example of an augmented reality view 500. View 500, as shown, is an example field of view of operator 350 in work machine 102. View 500 can be augmented either by a head-mounted device worn by operator 350 or by a device mounted on work machine 102 (e.g., projected onto the glass of the operator cab 101). View 500 includes a plurality of augmented objects (e.g., objects generated and displayed by augmentation interface generator logic 182) and real objects (e.g., objects in the line of sight of operator 350). For example, the hood of work machine 102 is a real object and hazard indicator 504 and text 506 are augmented or synthetic objects representing an underground hazard 204 that is a buried gas line.

Some examples of real objects in view 500 include work machine 102, worksite surface 512, landscape 514, exhaust 516 and pre-cleaner 518.

Some examples of augmented objects in view 500 include worksite boundary 505, at grade indicator 522, above grade indicator 524, below grade indicator 526 and miscellaneous indicator 550. Worksite boundary 505 may be generated by augmentation interface generator logic 182 to represent, and correspond with, the border of an area where work machine 102 is assigned to operate (e.g., the area that work machine 102 is assigned to grade).

At grade indicator 522 can be generated by finished grade logic 107 and displayed by augmentation interface generator logic 182 to represent, and correspond with, the area of worksite 100 where the assigned area is at the target, final or finish grade. In some examples, at grade indicator 522 is represented by a specific color (e.g., green) or pattern. In one example, at grade indicator 522 is represented by an absence of any augmented object (which can be distinguished from non-finished areas due to non-finished areas being emphasized).

Above grade indicator 524 can be generated by high terrain generator logic 195 and displayed by augmentation interface generator logic 182 to represent, and correspond with, an area of worksite 100 where the worksite surface is at an elevation above the target, final or finish grade. In some examples, above grade indicator 524 is represented by a specific color (e.g., red) or pattern (e.g., cross hatches as shown in FIG. 5).

Below grade indicator 524 can be generated by low terrain generator logic 196 and displayed by augmentation interface generator logic 182 to represent, and correspond with, an area of worksite 100 where the worksite surface is at an elevation below the target, final or finish grade. In some examples, below grade indicator 526 is represented by a specific color (e.g., blue) or pattern (e.g., cross hatches as shown in FIG. 5).

Hazard indicator 504 can be generated by augmentation interface generator logic 182 to represent, and correspond with, a hazard on worksite 100. As shown, hazard indicator 504 represents an underground hazard 204 that is a buried natural gas line. Hazard indicator 504 can be useful to operator 350, because in this instance, underground hazard 204 would otherwise not be visible to operator 350. Hazard generator logic 186 can also generate text 506 to indicate additional information on underground hazard 204. For instance, it can indicate underground hazard 204 is a gas line and not an electric line. It can be displayed in perspective, to show depth or it can be shown as a trace on the ground surface, or otherwise.

Miscellaneous indicator 550 can be generated by hazard generator logic 186 and displayed by augmentation interface generator logic 182 to display an additional indication to operator 350. For example, as shown in FIG. 5, miscellaneous indicator 550 displays a fuel gauge and temperature gauge. In other examples, miscellaneous indicator 550 can display other metrics or views as well. Miscellaneous indicator 550 can be movable across the display and move if another augmented object is to be displayed at the current position of miscellaneous indicator 550.

Figure 6:
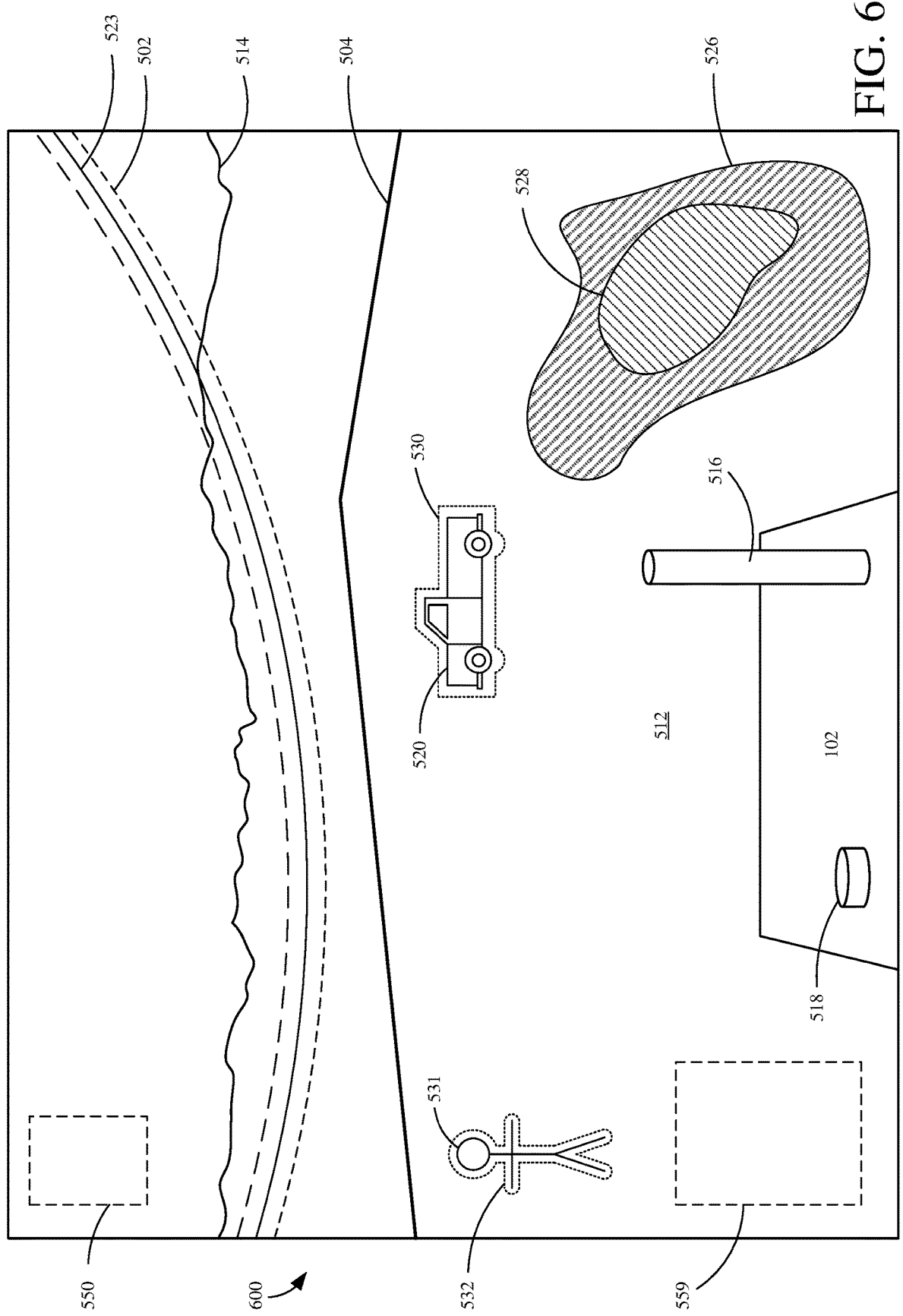
FIG. 6 is one example showing an augmented view of a field of view on an operator.

FIG. 6 shows one example of an augmented reality view 600. View 600, as shown, is from the point of view of operator 350 in work machine 102. Similar to view 500, view 600 can be augmented either by a head-mounted device worn by operator 350 or by a device mounted on work machine 102 (e.g., projected onto the glass of the operator cab 101). View 600 includes a plurality of augmented objects (e.g., objects generated and displayed by augmentation interface generator logic 182) and real objects (e.g., objects in the line of sight of operator 350).

Some examples of real objects in view 600 include work machine 102, worksite surface 512, landscape 514, exhaust 516, pre-cleaner 518, other work machine 520, person 531, and hazard 523.

Some examples of augmented objects in view 600 include hazard indicator 502, worksite boundary 505, below grade indicator 526, below grade indicator 528, machine indicator 530 and person indicator 532. Hazard indicator 502 can be generated and displayed by augmentation interface generator logic 182 to indicate to operator 350 hazard 523 is present at the location of hazard indicator 502. For example, hazard indicator 502 represents an overhead hazard 202.

Machine indicator 530 can be generated by mobile object generator logic 191 and displayed by augmentation interface generator logic 182 to indicate to operator 350 that machine 520 is present at the location of hazard indicator 530. As shown, machine indicator 530 is an outline. In other examples machine indicator 530 can include, shading, color or any other graphic to emphasize machine 520 to operator 350.

Person indicator 532 can be generated by mobile object generator logic 191 and displayed by augmentation interface generator logic 182 to indicate to operator 350 that person 531 is present at the location of person indicator 532. As shown, person indicator 532 is an outline. In other examples, person indicator 532 can include shading, color or any other graphic to emphasize person 523 to operator 350.

Below grade indicator 526 and below grade indicator 528 can be generated by low terrain generator logic 196 and displayed by augmentation interface generator logic 182 to represent, and correspond with, areas of worksite 100 where the worksite surface is at an elevation below the target, final or finish grade. As shown, below grade indicator 528 represents an area that is lower than the area represented by below grade indicator 526. In some examples, below grade indicator 526 is represented by a specific color (e.g., blue) or pattern (e.g., cross hatches as shown in FIG. 5) and below grade indicator 528 is represented by a different color (e.g., darker blue) or pattern (e.g., denser cross hatches).

Figure 7:
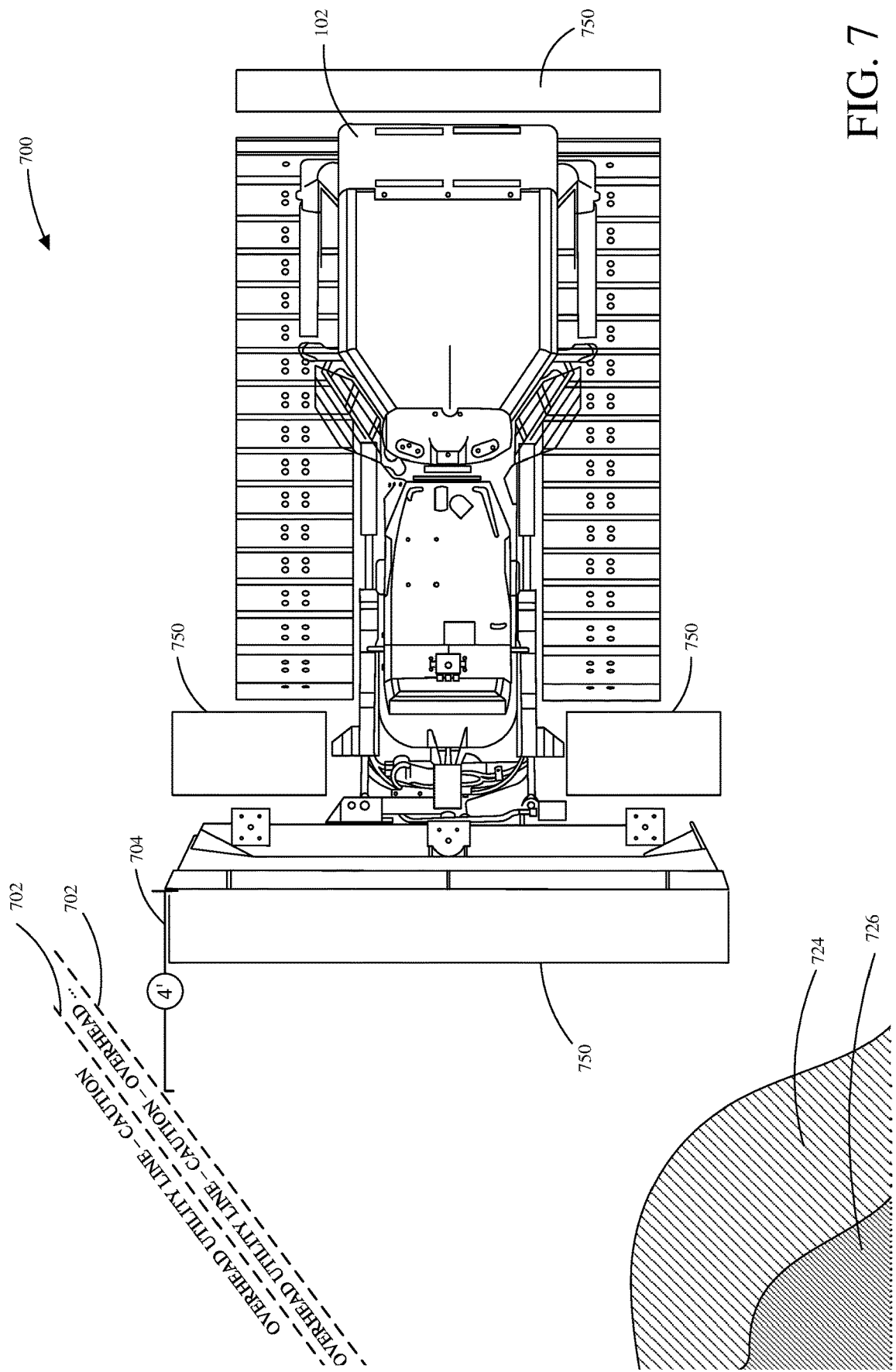
FIG. 7 is one example showing a bird's eye view of a work machine.

FIG. 7 shows one example of a bird's eye view display. View 700 includes work machine 102, hazard indicators 702, distance indicators 704, below grade indicators 724 and 726. View 700 can be generated by bird's eye view generator logic 180 and displayed on a display device 120 or augmented display device 128. For example, view 700 can be displayed on a digital display within operator cab 101. As another example, view 700 can be displayed on an augmented display device (e.g., on a windshield of operator cab 101 or a head-mounted device). View 700 shows blind spots 750. Blind spots 750 are areas where the view of operator 350 is obstructed by a portion of work machine 102. One example advantage of a bird's eye view, such as view 700, is that objects in blind spots 750 can be shown to operator 350. In some examples, nonvisual alert generator logic 184 notifies operator 350 of an object in a blind spot 750.

Hazard indicators 702, as shown, are indicative of overhead utility lines. In other examples hazard indicators 702 can be indicative of other hazards as well. For example, hazard indicators can be indicative of overhead hazards 202, underground hazards 204, people 210, other work machines 208, etc.

Distance indicator 704 is indicative of a distance from the overhead utility line (as indicated by hazard indicator 702) to work machine 102. As illustratively shown, work machine 102 is 4 feet away from the overhead utility line indicated by hazard indicator 702. In other examples, there may be more distance indicators 704. For example, there may be a distance indicator 704 between work machine 102 and below grade indicator 724. In another example, there may be a distance indicator 704 between work machine 102 and other objects, such as people 210, other work machines 208, etc.

Below grade indicator 724, as shown, is an area of worksite 100 where the worksite surface is below final, finish grade. In order for worksite 100 to be completely graded, this area should be raised to final finish grade. Additionally, below grade indicator 726 is indicative of an area that is even lower than the area represented by below grade indicator 724. In order for worksite 100 to be completely graded, this area should also be raised to final finish grade and will require more material than the area represented by below grade indicator 724. As shown, below grade indicator 724 and 726 are two different patterns. However, in other examples they may be represented by some other indication. For example, below grade indicators 724 and 726 may be colored to stand out from the rest of the surface of worksite 100. In another example, below grade indicators 724 and 726 may be a gradient that corresponds to the elevation at a given point. For instance, an area that is just below grade (e.g., area represented by 724) may be a light red color and an area that is more below grade will be a darker red color.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
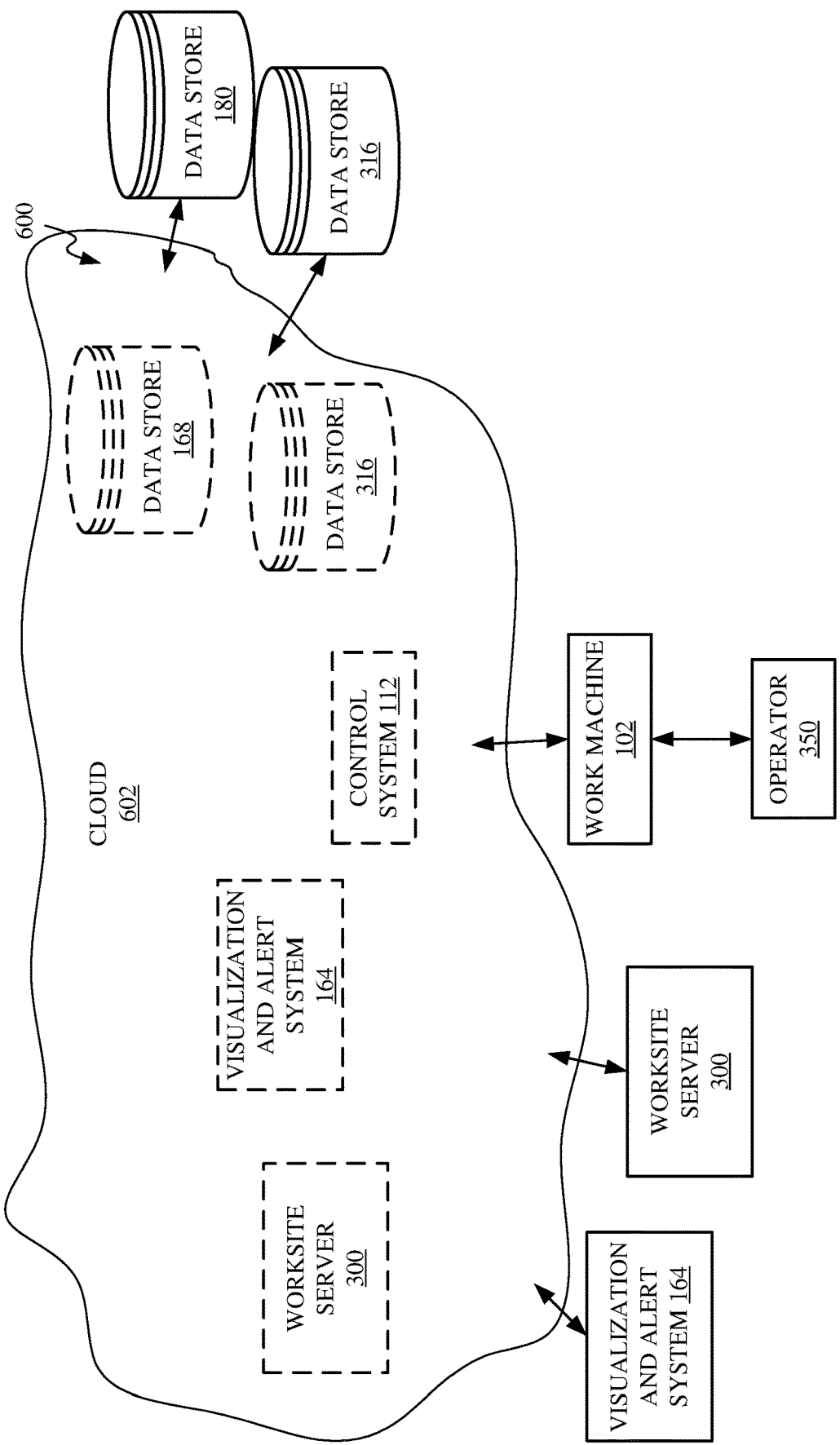
FIG. 8 is block diagram showing one example of the work machine deployed in a cloud computing architecture.

FIG. 8 is a block diagram of work machine 102, shown in FIGS. 3A and 3B, except that it communicates with elements in a remote server architecture 600. In an example, remote server architecture 600 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 3A and 3B as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIGS. 3A and 3B and they are similarly numbered. FIG. 8 specifically shows that control system 112, visualization and alert system 164, data store 168, worksite server 300, and/or data store 316 can be located at a remote server location 602. Therefore, work machine 102 accesses those systems through remote server location 602.

FIG. 8 also depicts another example of a remote server architecture. FIG. 8 shows that it is also contemplated that some elements of FIGS. 3A and 3B are disposed at remote server location 602 while others are not. By way of example, data store 180 or model generation system 103 can be disposed at a location separate from location 602, and accessed through the remote server at location 602. Regardless of where they are located, they can be accessed directly by work machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another work machine (such as a fuel truck) can have an automated information collection system. As the work machine comes close to the fuel truck for fueling, the system automatically collects the information from the work machine using any type of ad-hoc wireless connection. The collected information can then be forwarded to the main network as the fuel truck reaches a location where there is cellular coverage (or other wireless coverage). For instance, the fuel truck can enter a covered location when traveling to fuel other machines or when at a main fuel storage location. All of these architectures are contemplated herein. Further, the information can be stored on the work machine until the work machine enters a covered location. The work machine, itself, can then send the information to the main network.

It will also be noted that the elements of FIGS. 3A and 3B, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
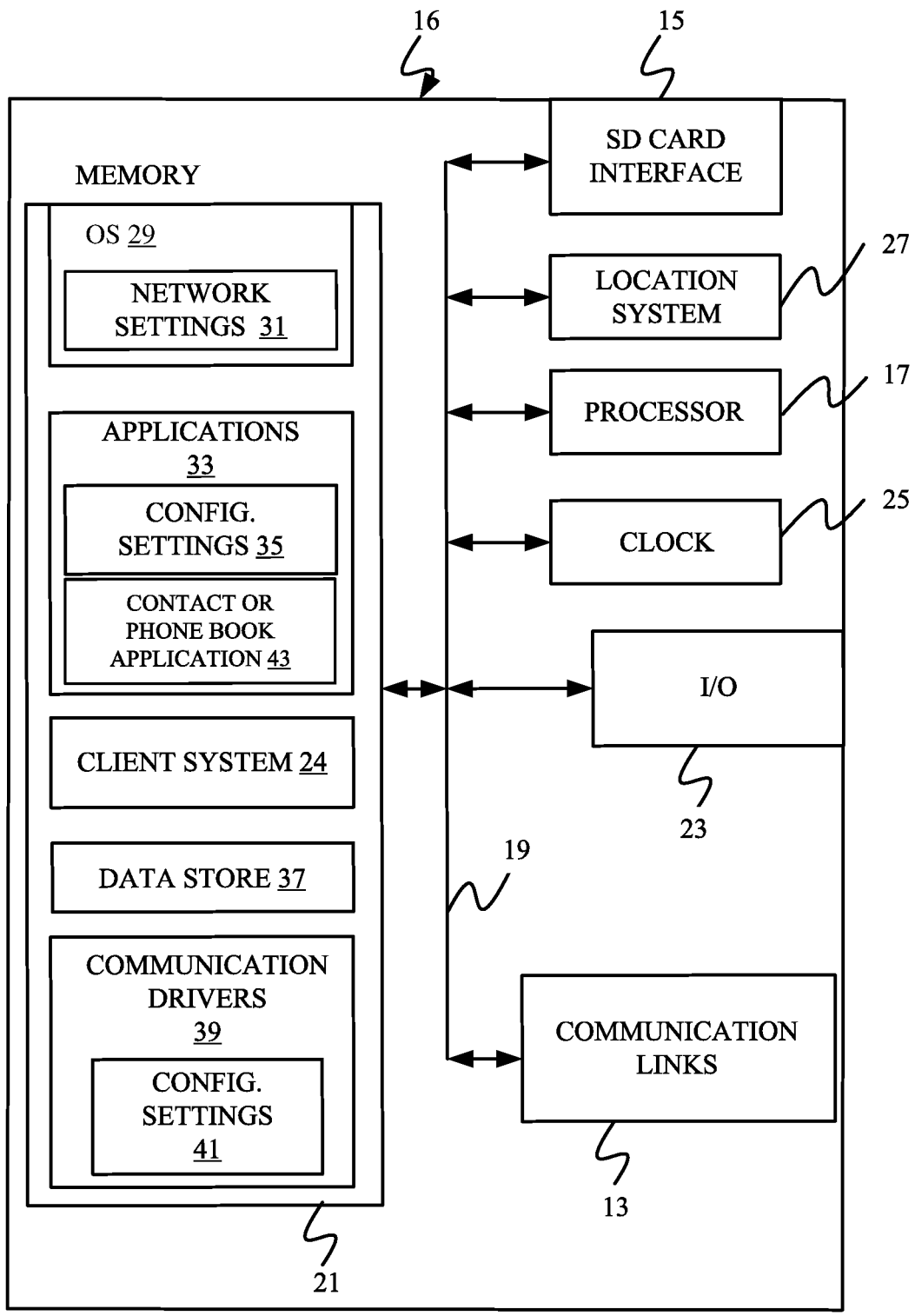
FIGS. 9-11 show block diagrams of mobile devices that can be used in the architectures shown in the previous figures.
Figure 10:
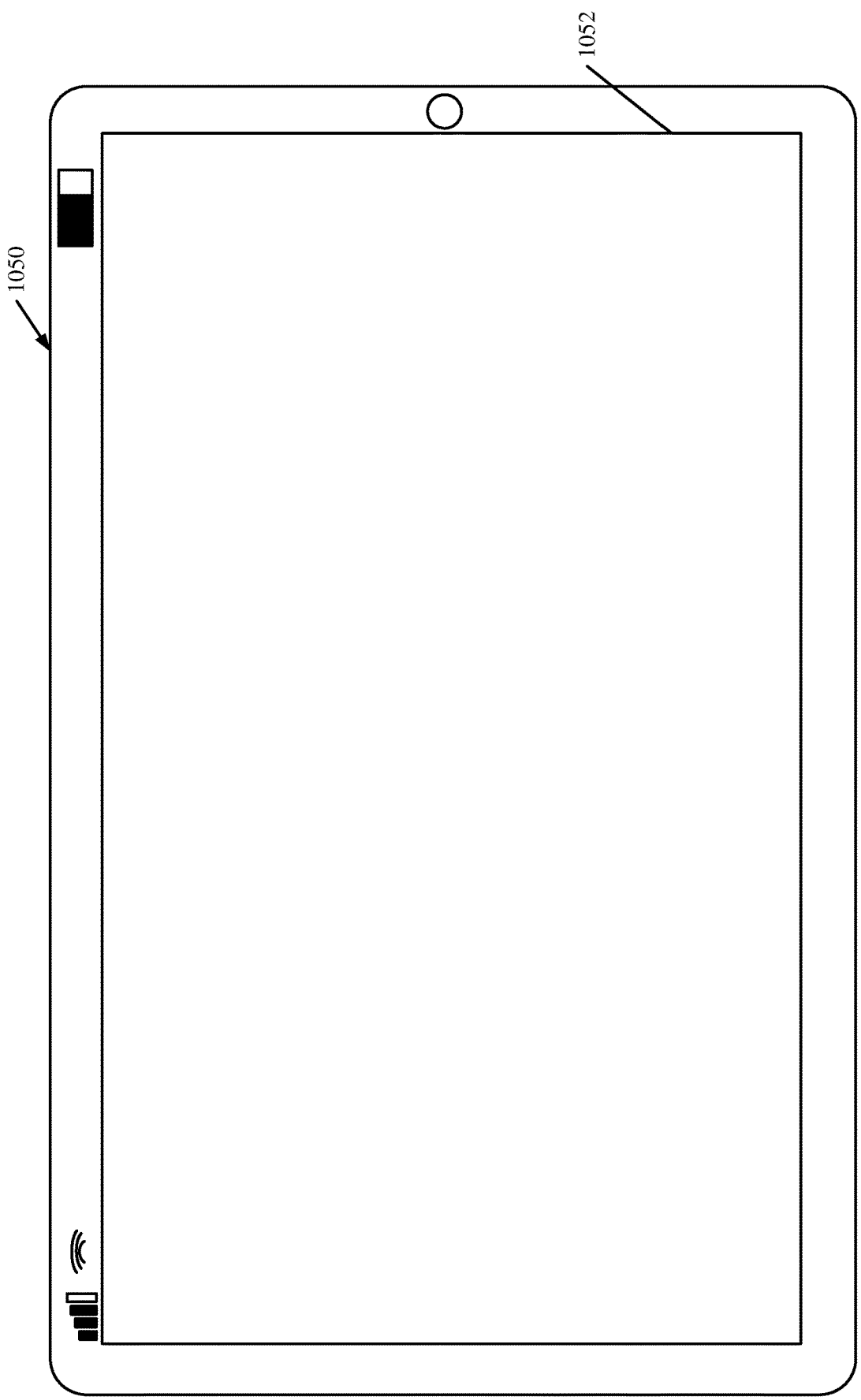
Figure 11:
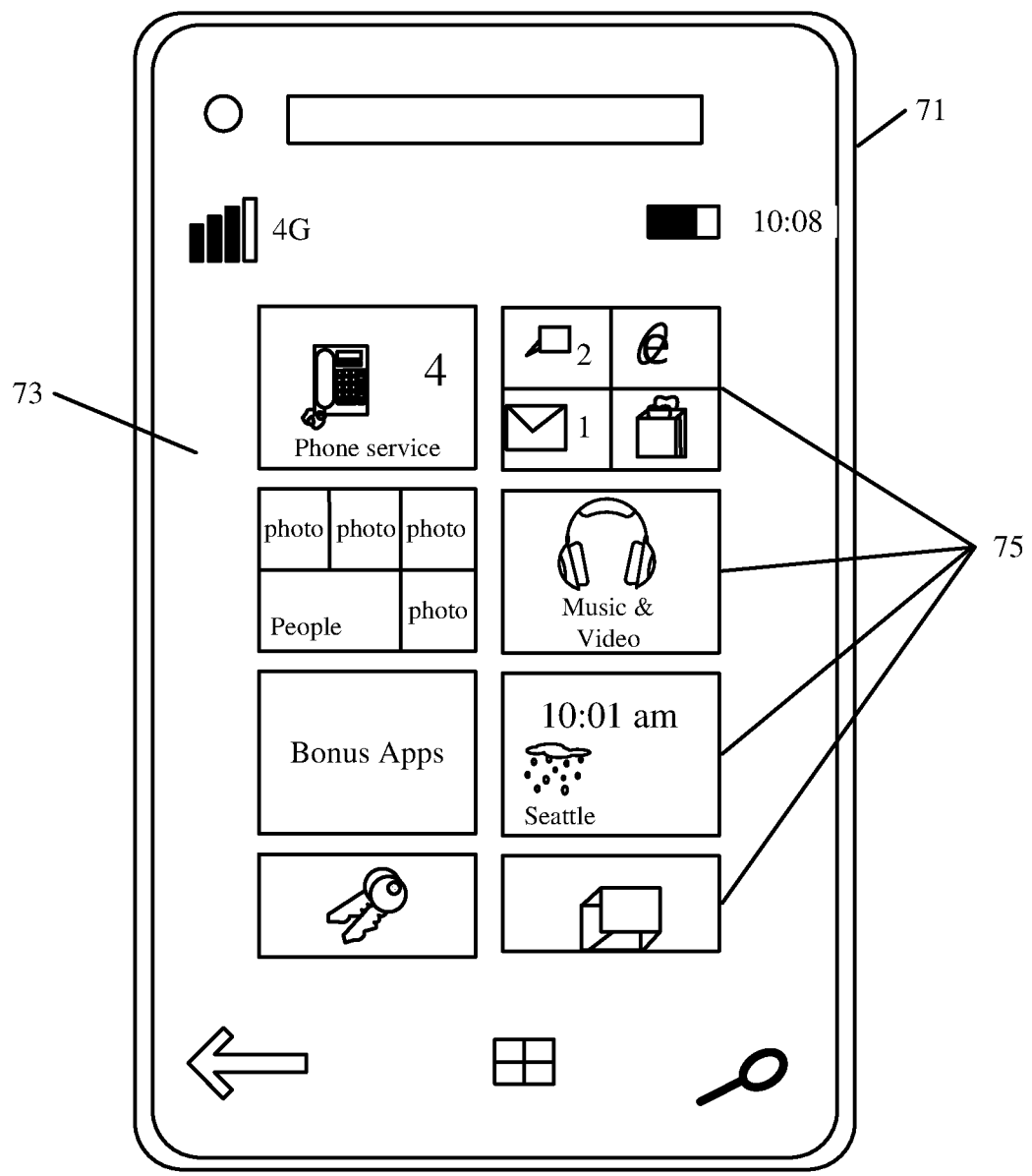

FIG. 9 is a simplified block diagram of one illustrative example of a handheld or mobile computing device that can be used as a user's or client's hand held device 16, in which the present system (or parts of it) can be deployed. For instance, a mobile device can be deployed in the operator compartment of work machine 102 for use in generating, processing, or displaying the spillage and productivity metrics, the recommendations, etc. FIGS. 10-11 are examples of handheld or mobile devices.

FIG. 9 provides a general block diagram of the components of a client device 16 that can run some components shown in FIGS. 3A and 3B, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

Under other examples, applications can be received on a removable Secure Digital (SD) card that is connected to an interface 15. Interface 15 and communication links 13 communicate with a processor 17 (which can also embody processor 122 from FIGS. 3A and 3B) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 1050. In FIG. 10, computer 1050 is shown with user interface display screen 1052. Screen 1052 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1050 can also illustratively receive voice inputs as well.

FIG. 11 provides an additional example of devices 16 that can be used, although others can be used as well. The phone in FIG. 11 is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

Figure 12:
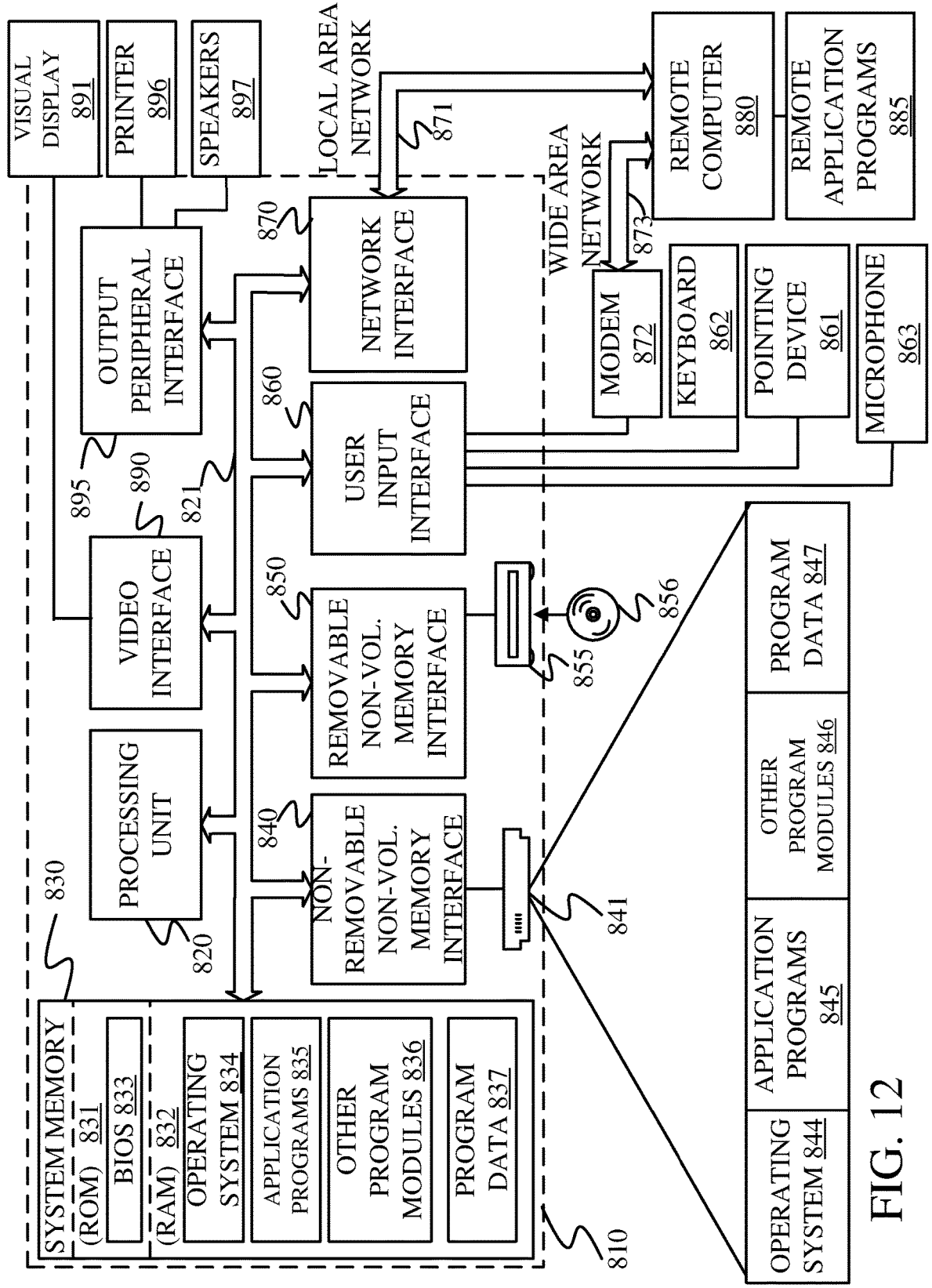
FIG. 12 is a block diagram of one example of a computing environment that can be used in the architectures shown in the previous figures.

FIG. 12 is one example of a computing environment in which elements of FIGS. 3A and 3B, or parts of it, (for example) can be deployed. With reference to FIG. 12, an example system for implementing some examples includes a general-purpose computing device in the form of a computer 810. Components of computer 810 can include, but are not limited to, a processing unit 820 (which can comprise processor 122), a system memory 830, and a system bus 821 that couples various system components including the system memory to the processing unit 820. The system bus 821 can be any of several types of bus structures including a memory bus or memory controller, a peripheral bus, and a local bus using any of a variety of bus architectures. Memory and programs described with respect to FIGS. 3A and 3B can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media can comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media can embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 can also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user can enter commands and information into the computer 810 through input devices such as a keyboard 862, a microphone 863, and a pointing device 861, such as a mouse, trackball or touch pad. Other input devices (not shown) can include a joystick, game pad, satellite dish, scanner, or the like. These and other input devices are often connected to the processing unit 820 through a user input interface 860 that is coupled to the system bus, but can be connected by other interface and bus structures. A visual display 891 or other type of display device is also connected to the system bus 821 via an interface, such as a video interface 890. In addition to the monitor, computers can also include other peripheral output devices such as speakers 897 and printer 896, which can be connected through an output peripheral interface 895.

The computer 810 is operated in a networked environment using logical connections (such as a local area network—LAN, or wide area network WAN, or a controller area network CAN) to one or more sensors or remote computers, such as a remote computer 880, or other components.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules can be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a work machine, comprising:
a frame;
a set of ground engaging elements movably supported by the frame and driven by an engine to drive movement of the mobile work machine in a worksite;
an actuator coupled to the set of ground engaging elements to controllably drive movement of the set of ground engaging elements;
a location sensor configured to sense a location of the work machine and generate a machine location sensor signal indicative of a location of the mobile work machine;
a communication component that communicates with a worksite server and retrieves object location data;
field of view logic that determines whether the object is within a field of view of an operator of the mobile work machine, based on the machine location sensor signal and object location data, and generates a field of view indication indicative of the determination; and
augmentation logic that generates an augmented reality overlay, based on the field of view indication, and controls an augment display to displays an indication of the object proximate the object within the field of view of the operator.

Example 2 is the work machine of any or all previous examples wherein the object comprises:
a portion of a surface of the worksite; and
wherein the work machine further comprises:
terrain generator logic that compares a height of the portion of the surface to a threshold elevation and generates an elevation indication based on the determination; and
wherein the indication of the object displayed by augmentation logic is indicative of the elevation indication.

Example 3 is the work machine of any or all previous examples wherein the indication of the object comprises:
a first indication, if the elevation indication is indicative of the portion of the surface being below the threshold; and
a second indication, if the elevation indication is indicative of the portion of the surface being above the threshold.

Example 4 is the work machine of any or all previous examples, wherein the first indication comprises a first color, and the second indication comprises a second color.

Example 5 is the work machine of any or all previous examples, wherein the first indication comprises a first pattern, and the second indication comprises a second pattern.

Example 6 is the work machine of any or all previous examples, wherein the indication of the object comprises:
a third indication, if the elevation indication is indicative of the portion of the surface being substantially at the threshold.

Example 7 is the work machine of any or all previous examples wherein the object comprises:
a hazard; and
wherein the work machine further comprises:
hazard generator logic that determines a type of hazard and generates a hazard indication based on the determination; and
wherein the indication of the object displayed by augmentation logic is indicative of the hazard indication.

Example 8 is the work machine of any or all previous examples, wherein the hazard comprises a mobile object and the indication of the object emphasizes the hazard such that it is visually different than its surroundings.

Example 9 is the work machine of any or all previous examples, wherein the hazard comprises a mobile object and the indication of the object emphasizes the hazard such that it is visually different than its surroundings.

Example 10 is the work machine of any or all previous examples, wherein the hazard comprises a utility and the indication of the object identifies a type of the utility.

Example 11 is the work machine of any or all previous examples, further comprising:

non-visual alert generator logic configured to generate an audible alert when the work machine is within a threshold distance of the object.

Example 12 is the work machine of any or all previous examples, further comprising:

an operator sensor that detects a characteristic of the operator and generates an operator sensor signal indicative of the sensed characteristic; and wherein the field of view logic determines whether the object is within a field of view of an operator of the mobile work machine, based on the operator sensor signal.

Example 13 is the work machine of any or all previous examples further comprising:

collision logic configured to receive a commanded movement from the operator and determine whether the commanded movement will result in contact between the work machine.

Example 14 is a visualization and alert system for a work machine, the system comprising:

communication logic that receives, from a worksite server, object data for a plurality of objects in a worksite and terrain data of the worksite;

model generator logic that receives the object data, terrain data and generates a worksite model based on the object data and terrain data;

terrain generator logic that receives the worksite model and a finished grade model and determines a difference between the worksite model and finished grade model and generates a terrain difference indication, indicative of the difference between the worksite model and finished grade model;

hazard generator logic that receives the worksite model and a location of the work machine and generates an object indication, indicative of a position an object of interest; and augmentation logic that generates an augmented display overlay based on the terrain difference indication and object indication;

wherein the augmentation logic controls an augmented display to display the augmented display overlay to an operator of the work machine.

Example 15 is the visualization and alert system of any or all previous examples, wherein the augment display overlay comprises:

an object interface component that emphasizes the object, such that the object is visually different from its surroundings; and a terrain interface component that emphasizes a portion of a worksite surface, such that the portion of the worksite surface is visually different than another portion of the worksite surface that is at a different elevation.

Example 16 is the visualization and alert system of any or all previous examples, wherein the object interface component comprises an indication of a type of hazard Example 17 is the visualization and alert system of any or all previous examples further comprising nonvisual alert generator logic that generates a nonvisual alert indicative of the presence of an object proximate the work machine.

Example 18 is a method of displaying information on an augmented device of a work machine, the method comprising:

sensing, utilizing a position sensor, a machine position of the work machine;

sensing, utilizing an operator sensor, an operator position, relative to the augmented device;

receiving, utilizing communication logic, an object position from a worksite server, indicative of the position of an object external to the work machine;

identifying, utilizing field of view logic, a field of view of an operator associated with the augmented reality device;

determining, utilizing the field of view logic, whether the object is within the field of view of the operator and generating a field of view signal indicative of the determination;

generating, utilizing augmentation logic, an augmented display component based on the field of view signal, the augmented display component being indicative of a characteristic of the object; and controlling, utilizing augmentation logic, the augmentation device to display the augmented display component, such that the indication is visually overlaid on the object in the field of view of the operator.

Example 19 is the method of any or all previous examples, wherein the object comprises a portion of a surface of the worksite; and generating the augmented display component comprises:

determining, utilizing terrain generator logic, an elevation of the object relative to a target elevation and generating a terrain indication, indicative of the determination; and generating the augmented display component based on the terrain indication.

Example 20 is the method of any or all previous examples, wherein the object comprises a hazard in the worksite; and generating the augmented display component comprises:

determining, a type of hazard and generating a hazard indication, indicative of the determination; and generating the augmented display component based on the hazard indication.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A mobile work machine, comprising:
a frame;
a set of ground engaging elements movably supported by the frame;
an actuator coupled to the set of ground engaging elements to controllably drive movement of the set of ground engaging elements to drive movement of the mobile work machine in a worksite;
a location sensor configured to sense a location of the mobile work machine and generate a machine location sensor signal indicative of a location of the mobile work machine;
field of view logic that receives object location data of an object wherein the object comprises a portion of a surface, and determines whether the object is within a field of view of an operator of the mobile work machine, based on the machine location sensor signal and object location data, and generates a field of view indication indicative of the determination;
terrain generator logic that compares a height of the portion of the surface to a threshold elevation and generates an elevation indication indicating an elevation of the portion of the surface relative to the threshold elevation based on the determination;

a display device;

augmentation logic that generates an augmented display, based on the field of view indication, and controls the display device to display the augmented display showing the elevation indication at a location proximate the portion of the surface, in perspective, within the field of view of the operator; and wherein the elevation indication comprises:

a first indication, if the elevation indication is indicative of the portion of the surface being below the threshold elevation; and a second indication visually different from the first indication, if the elevation indication is indicative of the portion of the surface being above the threshold elevation.

2. The work machine of claim 1, wherein the first indication comprises a first color, and the second indication comprises a second color.

3. The work machine of claim 1, wherein the first indication comprises a first visual pattern, and the second indication comprises a second visual pattern.

4. The work machine of claim 1, wherein the augmentation logic displays the indication of the object as a third indication, visually different from the first and second indications, if the elevation indication is indicative of the portion of the surface being substantially at the threshold elevation.

5. The work machine of claim 1 field of view logic that receives second object location data indicative of location of a second object wherein the second object comprises a hazard and wherein the work machine further comprises:

hazard generator logic that determines a type of hazard and generates a hazard indication based on the determination; and wherein the augmentation logic displays the hazard indication indicative of a hazard location.

6. The work machine of claim 5, wherein the hazard comprises a mobile object and the indication of the object visually distinguishes the hazard from its surrounding.

7. The work machine of claim 5, wherein the hazard comprises a utility and wherein the augmentation logic is configured to generate the indication of the object to identify a type of the utility.

8. The work machine of claim 5, wherein the augmentation logic is configured to generate the indication of the object to include an indication of a distance to the object from the mobile work machine.

9. The work machine of claim 1, further comprising:

non-visual alert generator logic configured to generate an audible alert when the work machine is within a threshold distance of the object.

10. The work machine of claim 5, further comprising:

an operator sensor that detects a characteristic of the operator and generates an operator sensor signal indicative of the sensed characteristic; and wherein the field of view logic determines whether the object is within a field of view of an operator of the mobile work machine, based on the operator sensor signal.

11. The work machine of claim 1 further comprising:

collision logic configured to receive a commanded movement from the operator and determine whether the commanded movement will result in contact between the work machine and a second object in the worksite.

12. The work machine of claim 1 wherein the display device comprises ahead-mounted device.

13. The work machine of claim 1 wherein the display device comprises a cab window.

* * * * *